(12) United States Patent
Zhao et al.

(10) Patent No.: US 12,451,088 B2
(45) Date of Patent: Oct. 21, 2025

(54) LIQUID CRYSTAL DISPLAY DEVICE AND CONTROL MODULE THEREOF, AND INTEGRATED BOARD

(71) Applicants: Beijing BOE Display Technology Co., Ltd., Beijing (CN); BOE Technology Group Co., Ltd., Beijing (CN)

(72) Inventors: Yucheng Zhao, Beijing (CN); Zhiming Meng, Beijing (CN); Minghan Li, Beijing (CN); Jianzi He, Beijing (CN); Junning Su, Beijing (CN); He Chao, Beijing (CN); Hanzhang Niu, Beijing (CN); Jialing Lv, Beijing (CN); Yuejiang Yang, Beijing (CN); Jianyang Liu, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/557,969

(22) PCT Filed: Apr. 29, 2022

(86) PCT No.: PCT/CN2022/090589
§ 371 (c)(1),
(2) Date: Oct. 30, 2023

(87) PCT Pub. No.: WO2023/206490
PCT Pub. Date: Nov. 2, 2023

(65) Prior Publication Data
US 2025/0087173 A1    Mar. 13, 2025

(51) Int. Cl.
*G09G 3/36* (2006.01)
*G09G 3/34* (2006.01)

(52) U.S. Cl.
CPC ............ *G09G 3/3426* (2013.01); *G09G 3/36* (2013.01); *G09G 2300/02* (2013.01);
(Continued)

(58) Field of Classification Search
None
See application file for complete search history.

(56) References Cited

U.S. PATENT DOCUMENTS

| | | | | |
|---|---|---|---|---|
| 2006/0077645 | A1* | 4/2006 | Yang | G06F 1/1601 361/769 |
| 2007/0257899 | A1* | 11/2007 | Ao | H05K 1/141 345/204 |

(Continued)

FOREIGN PATENT DOCUMENTS

| | | |
|---|---|---|
| CN | 101515436 A | 8/2009 |
| CN | 102663984 A | 9/2012 |

(Continued)

OTHER PUBLICATIONS

Written Opinion from PCT/CN2022/090589 dated Jan. 19, 2023.
International Search Report from PCT/CN2022/090589 dated Jan. 19, 2023.

*Primary Examiner* — Amr A Awad
*Assistant Examiner* — Donna V Bocar
(74) *Attorney, Agent, or Firm* — Calfee, Halter & Griswold LLP

(57) ABSTRACT

The present disclosure provides a liquid crystal display device and a control module thereof, and an integrated board, and relates to the field of display technologies. The integrated board includes a field programmable gate array and a backlight driver unit on a same circuit board. The field programmable gate array is configured to: receive screen data, generate screen synchronization data based on the screen data, and send the screen synchronization data to a liquid crystal display panel, and generate backlight drive (Continued)

data based on the screen data and send the backlight drive data to the backlight driver unit. The backlight driver unit is configured to receive the backlight drive data, where a delay between receiving the backlight drive data and receiving the screen synchronization data is less than one frame of time.

19 Claims, 15 Drawing Sheets

(52) U.S. Cl.
CPC ............ *G09G 2320/0247* (2013.01); *G09G 2320/0673* (2013.01); *G09G 2330/021* (2013.01)

(56) References Cited

U.S. PATENT DOCUMENTS

| | | | | |
|---|---|---|---|---|
| 2009/0115907 | A1* | 5/2009 | Baba | G09G 3/3406 348/E5.062 |
| 2011/0102450 | A1* | 5/2011 | Santo | G09G 3/3406 345/589 |
| 2016/0048366 | A1* | 2/2016 | Cowin | H04W 12/08 726/4 |
| 2017/0345379 | A1 | 11/2017 | Guo | |
| 2018/0204528 | A1* | 7/2018 | Miyazawa | G09G 3/34 |
| 2020/0342819 | A1* | 10/2020 | Cheng | G09G 3/342 |
| 2023/0102676 | A1* | 3/2023 | Monomoshi | G09G 3/3648 345/102 |
| 2023/0186863 | A1* | 6/2023 | Oka | G09G 3/342 345/102 |

FOREIGN PATENT DOCUMENTS

| | | |
|---|---|---|
| CN | 204166875 U | 2/2015 |
| CN | 2041668785 U | 2/2015 |
| CN | 104409059 A | 3/2015 |
| CN | 106057134 A | 10/2016 |
| CN | 207199271 U | 4/2018 |
| CN | 109616058 A | 4/2019 |
| CN | 109637461 A | 4/2019 |
| CN | 208861109 U | 5/2019 |
| CN | 208922664 U | 5/2019 |
| CN | 111199714 A | 5/2020 |
| CN | 211062398 U | 7/2020 |
| CN | 109616058 B | 11/2020 |
| CN | 112331153 A | 2/2021 |
| CN | 112419987 A | 2/2021 |
| CN | 112767892 A | 5/2021 |
| CN | 111199714 B | 9/2021 |
| CN | 113823235 A | 12/2021 |
| CN | 114067757 A | 2/2022 |
| CN | 113823235 B | 3/2022 |
| JP | 2007271665 A | 10/2007 |
| JP | 2013125089 A | 6/2013 |
| KR | 20070082190 A | 8/2007 |
| TW | 201947573 A | 12/2019 |
| WO | 2022022093 A1 | 2/2022 |

\* cited by examiner

LIQUID CRYSTAL DISPLAY DEVICE AND CONTROL MODULE THEREOF, AND INTEGRATED BOARD

CROSS-REFERENCE TO RELATED APPLICATIONS

The present application is the U.S. National phase application of International Application No. PCT/CN2022/090589, filed on Apr. 29, 2022, the entire contents of which are hereby incorporated by reference in its entirety.

TECHNICAL FIELD

The present disclosure relates to the field of display technologies, and in particular, to a liquid crystal display device and a control module thereof, and an integrated board.

BACKGROUND

Local Dimming function can significantly improve the display effect of the Liquid Crystal Display (LCD) device. However, the LCD panel and the backlight module do not respond synchronously to the synchronization data, which leads to a certain flickering effect when displaying some images, such as when switching between black and white images.

It should be noted that the above information disclosed in the "BACKGROUND" section is intended only to enhance the understanding of the background of this disclosure, and therefore it may include information that does not constitute prior art known to those of ordinary skill in the art.

SUMMARY

The present disclosure provides a liquid crystal display device and a control module thereof, and an integrated board.

According to one aspect of the present disclosure, there is provided an integrated board for a liquid crystal display device, the integrated board including a field programmable gate array and a backlight driver unit on a same circuit board.

The field programmable gate array is configured to: receive screen data, generate screen synchronization data based on the screen data, and send the screen synchronization data to a liquid crystal display panel, and generate backlight drive data based on the screen data and send the backlight drive data to the backlight driver unit.

The backlight driver unit is configured to receive the backlight drive data, wherein a delay between receiving the backlight drive data and receiving the screen synchronization data is less than one frame of time.

According to one embodiment of the present disclosure, the integrated board further includes a storage module. The storage module is a storage circuit on the circuit board, or the storage module is a storage unit of the field programmable gate array, or the storage module includes a storage unit of the field programmable gate array and a storage circuit on the circuit board.

The storage module is configured to store configuration information for the backlight driver unit, a debugging interface configuration, and at least part of programs for the field programmable gate array.

The field programmable gate array is configured to generate, based on the screen data, the screen synchronization data and backlight synchronization data, and to cache the screen synchronization data and the backlight synchronization data to the storage module.

The field programmable gate array is further configured to forward the screen synchronization data in the storage module to the liquid crystal display panel, to generate the backlight drive data based on the backlight synchronization data and the configuration information of the backlight driver unit in the storage module, and to send the backlight drive data to the backlight driver unit.

The field programmable gate array is further configured to invoke the debugging interface configuration in response to a debugging signal and cause the liquid crystal display device to display a debugging interface.

According to one embodiment of the present disclosure, the storage circuit includes a first storage sub-circuit on the circuit board, the first storage sub-circuit storing the configuration information of the backlight driver unit.

The field programmable gate array is configured to generate, based on the screen data, the screen synchronization data and the backlight synchronization data, and to cache the screen synchronization data and the backlight synchronization data to the first storage sub-circuit.

The field programmable gate array is further configured to forward the screen synchronization data in the first storage sub-circuit to the liquid crystal display panel, to generate the backlight drive data based on the backlight synchronization data and the configuration information of the backlight driver unit in the first storage sub-circuit, and to send the backlight drive data to the backlight driver unit.

According to one embodiment of the present disclosure, the storage circuit includes a second storage sub-circuit on the circuit board, the second storage sub-circuit storing the debugging interface configuration.

The field programmable gate array is further configured to invoke the debugging interface configuration in response to the debugging signal and cause the liquid crystal display device to display the debugging interface.

According to one embodiment of the present disclosure, the storage circuit includes a third storage sub-circuit on the circuit board, the third storage sub-circuit storing the at least part of the programs for the field programmable gate array.

According to one embodiment of the present disclosure, the field programmable gate array includes a first field programmable gate array and a second field programmable gate array.

The first field programmable gate array is configured to receive the screen data and forward the screen data to the second field programmable gate array.

The second field programmable gate array is configured to generate, based on the screen data, the screen synchronization data and the backlight drive data; and the second field programmable gate array is further configured to send the screen synchronization data to the liquid crystal display panel and to send the backlight drive data to the backlight driver unit within the same frame of time.

According to one embodiment of the present disclosure, the integrated board includes a first storage sub-circuit and a third storage sub-circuit located on the circuit board.

The first storage sub-circuit storing configuration information for the backlight driver unit, the third storage sub-circuit storing at least part of programs for the second field programmable gate array.

The second field programmable gate array is configured to generate, based on the screen data, the screen synchronization data and backlight synchronization data, and to cache the screen synchronization data and the backlight synchronization data to the first storage sub-circuit; and the second field programmable gate array is further configured to, within the same frame of time, forward the screen synchronization data in the first storage sub-circuit to the liquid crystal display panel, to generate the backlight drive data based on the backlight synchronization data and the configuration information of the backlight driver unit in the first storage sub-circuit, and to send the backlight drive data to the backlight driver unit.

According to one embodiment of the present disclosure, the integrated board includes a second storage sub-circuit on the circuit board, the second storage sub-circuit storing debugging interface configuration.

The first field programmable gate array is further configured to receive a debugging signal, to invoke the debugging interface configuration in response to the debugging signal, to generate a debugging screen, and to transmit the degugging screen as the screen data to the second field programmable gate array.

According to one embodiment of the present disclosure, the circuit board is further provided with a power supply module, a power management unit, and a gamma voltage unit.

The power supply module is configured to connect to an external power supply and to supply power to the power management unit and the backlight driver unit.

The power management unit is configured to supply a plurality of different supply voltages to the liquid crystal display panel, and to supply power to the gamma voltage unit.

The gamma voltage unit is configured to provide the liquid crystal display panel with a common voltage and a gamma binding point voltage corresponding to each binding point's gray scale.

The field programmable gate array is powered by the power supply module or the power management unit.

According to one embodiment of the present disclosure, the integrated board further includes a power supply selection unit configured to select one of the power supply module and the power management unit to supply power to the field programmable gate array.

According to one embodiment of the present disclosure, the integrated board further includes a communication module on the circuit board, wherein the communication module is configured to perform at least one of following functions: receiving a video signal, receiving a control signal, and sending a signal to an external device.

According to one embodiment of the present disclosure, the communication module includes a video signal port and a signal conversion unit. The video signal port is configured to receive the video signal and forward the video signal to the signal conversion unit.

The signal conversion unit is configured to transcode the video signal into the screen data, and to forward the screen data to the field programmable gate array.

According to one embodiment of the present disclosure, the video signal port includes at least one of: a High Definition Multimedia Interface (HDMI) port, a Digital Visual Interface (DVI) port, a Video Graphics Array (VGA) port and a DisplayPort (DP) port.

According to one embodiment of the present disclosure, the communication module includes a serial input port and a serial output port.

The serial input port is configured to transmit the control signal to the field programmable gate array.

The serial output port is configured to send a signal generated by the field programmable gate array to the external device.

According to one embodiment of the present disclosure, the communication module includes an infrared sensor.

The infrared sensor is configured to generate the control signal by receiving an infrared signal, and to transmit the control signal to the field programmable gate array.

According to one embodiment of the present disclosure, the communication module includes a microprocessor and at least one of: a serial input port, a serial output port, and an infrared sensor.

The microprocessor is configured to interact with the field programmable gate array.

The serial input port is configured to transmit the control signal to the microprocessor or the field programmable gate array.

The serial output port is configured to send a signal generated by the field programmable gate array or by the microprocessor to the external device.

The infrared sensor is configured to generate the control signal by receiving an infrared signal, and to transmit the control signal to the field programmable gate array or the microprocessor.

According to one embodiment of the present disclosure, the integrated board is provided with a system board interface module on the circuit board, the system board interface module being configured to connect to a system board.

According to one embodiment of the present disclosure, the system board interface module includes:

a screen data port configured to receive the screen data from the system board and send the screen data to the field programmable gate array, the screen data being generated by the system board based on a video signal.

According to one embodiment of the present disclosure, the integrated board includes a power supply module on the circuit board.

The system board interface module includes a system board power port, the system board power port being electrically connected to the power supply module and configured to be capable of supplying power to the system board.

According to one embodiment of the present disclosure, the system board interface module includes a backlight control port configured to receive a backlight control signal from the system board and to transmit the backlight control signal to the field programmable gate array.

According to one embodiment of the present disclosure, the integrated board further includes a microprocessor on the circuit board, the microprocessor being configured to interact with the field programmable gate array.

The system board interface module includes a backlight control port configured to receive a backlight control signal from the system board and to transmit the backlight control signal to the field programmable gate array or the microprocessor.

According to one embodiment of the present disclosure, the backlight driver unit is configured to drive a backlight module directly based on the backlight drive data.

According to another aspect of the present disclosure, there is provided a control module for a liquid crystal display device, including the integrated board as described above.

According to yet another aspect of the present disclosure, there is provided a liquid crystal display device including the control module as described above. The liquid crystal display device further includes a liquid crystal display panel and a backlight module, the integrated board being electrically connected with the liquid crystal display panel and the backlight module.

According to one embodiment of the present disclosure, the backlight module includes a plurality of light areas distributed in an array that are configured to be driven by local dimming.

According to one embodiment of the present disclosure, the liquid crystal display panel is a spliced display panel and includes a plurality of sub-display panels.

It should be understood that the above general description and the following detailed descriptions are exemplary and explanatory only and do not limit the present disclosure.

BRIEF DESCRIPTION OF THE DRAWINGS

The accompanying drawings herein are incorporated into and form part of the specification, show embodiments that are consistent with the present disclosure, and are used in conjunction with the specification to explain the principles of the present disclosure. It will be apparent that the accompanying drawings in the following description are only some of embodiments of the present disclosure, and that other drawings may be obtained from these drawings without creative effort by those of ordinary skill in the art.

DETAILED DESCRIPTION

Figure 1:
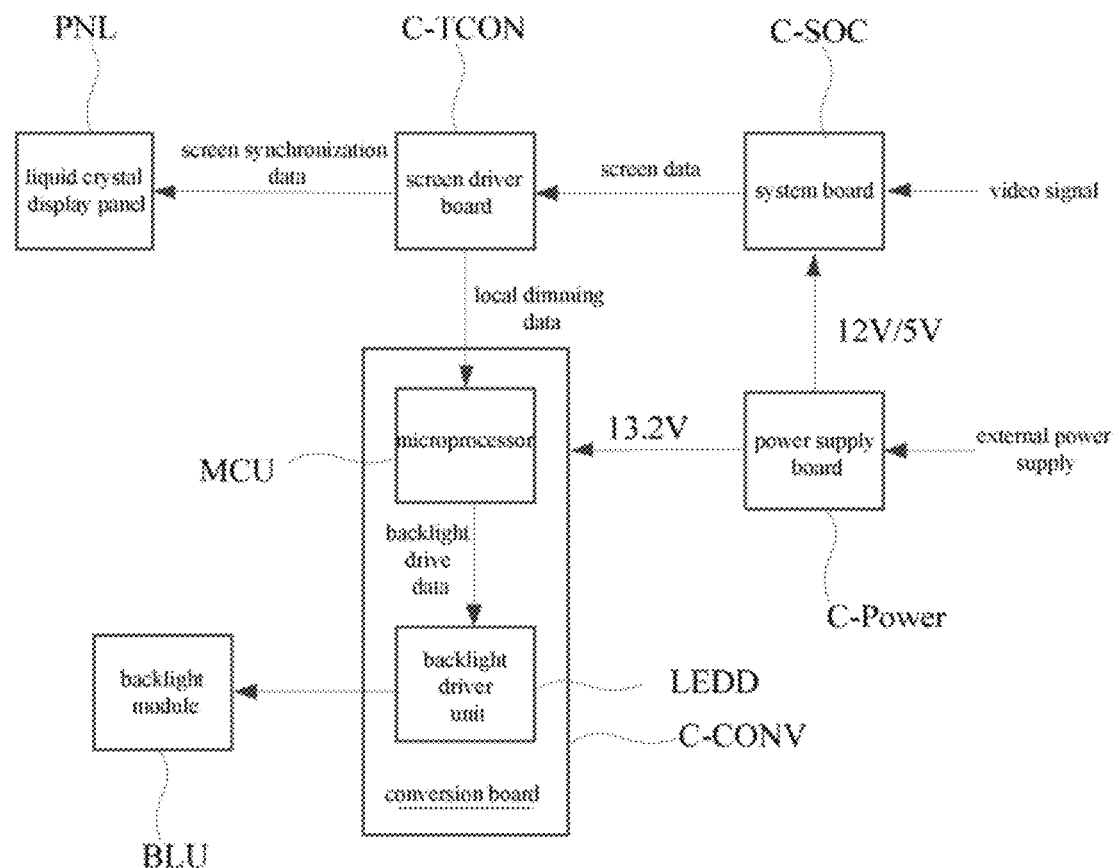
FIG. 1 is a schematic diagram of architecture of a control module in the related art.

Exemplary embodiments will now be described more fully with reference to the accompanying drawings. However, the exemplary embodiments can be implemented in a variety of forms and should not be construed as being limited to the embodiments set forth herein; rather, the provision of these embodiments makes the present disclosure comprehensive and complete and conveys the ideas of the exemplary embodiments to those skilled in the art in a comprehensive manner. The same reference numerals in the drawings indicate the same or similar structures, and thus their detailed description will be omitted. In addition, the accompanying drawings are only schematic illustrations of the present disclosure and are not necessarily drawn to scale.

Although relative terms such as "above" and "below" are used in this specification to describe the relative relationship of one component of the sign to another, these terms are used in this specification only for convenience, for example, according to the direction of the examples described in the accompanying drawings. It should be understood that if the device of the sign is inverted so that it is upside down, the component described as being "above" will become the component described as being "below". When a structure is "on" another structure, it may mean that the structure is integrally formed on another structure, or that the structure is "directly" arranged on another structure, or that the structure is "indirectly" arranged on another structure through yet another structure.

The terms "a/an", "one", "the", "said" and "at least one" are used to indicate the existence of one or more elements/components/etc. The terms "including" and "having" are used to indicate open-ended inclusion and to mean that additional elements/components/etc. may exist in addition to the listed elements/components/etc. The terms "first", "second" and "third" are used as markers only and are not limitations on the number of objects thereof.

FIG. 1 illustrates a schematic diagram of architecture of a control module of a liquid crystal display device in the related art. In the related art, the control module of the liquid crystal display device includes four boards, namely, a conversion board C-CONV, a system board C-SOC, a power supply board C-Power, and a screen driver board C-TCON. The power supply board C-Power is configured to supply power to the system board C-SOC and the conversion board C-CONV. After receiving a video signal, the system board C-SOC transcodes it into screen data and transmits the screen data to the screen driver board C-TCON. On the one hand, the screen driver board C-TCON generates screen synchronization data and transmits it to a source driver circuit of a liquid crystal display panel PNL so that the source driver circuit can drive the liquid crystal display panel PNL according to the screen synchronization data, and on the other hand, the screen driver board C-TCON needs to calculate and obtain local dimming data of a backlight module BLU according to the screen data and then send the local dimming data to a microprocessor MCU on the conversion board C-CONV. The microprocessor MCU generates backlight drive data according to the local dimming data and sends the backlight drive data to a backlight driver unit LEDD on the conversion board C-CONV. The backlight driver unit LEDD drives individual light sources of the backlight module BLU according to the backlight drive data.

Figure 2:
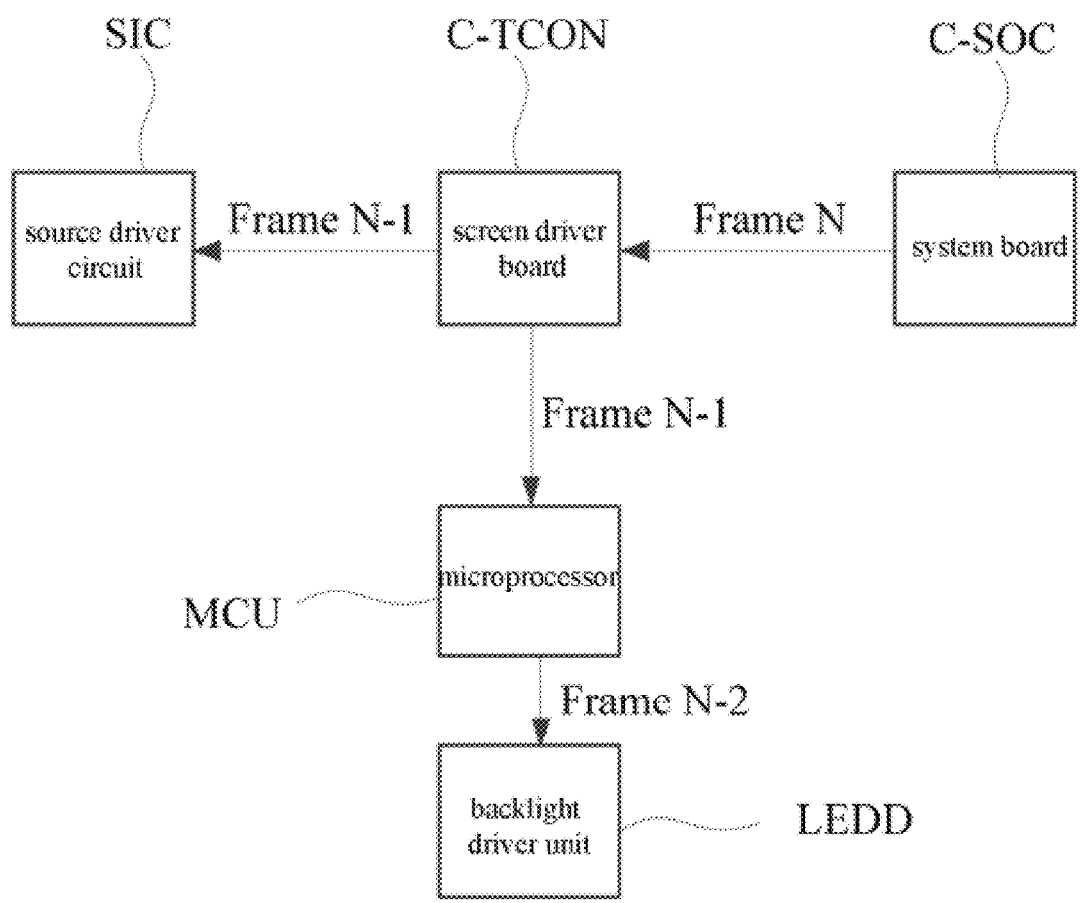
FIG. 2 is a schematic diagram of a driving process of a control module in the related art.
Figure 3:
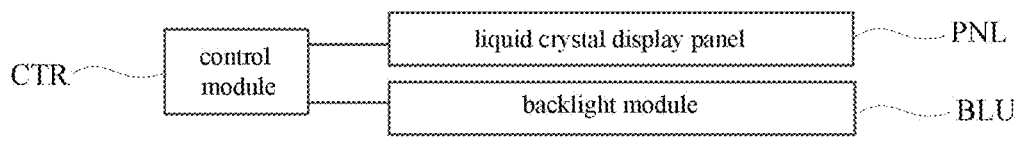
FIG. 3 is a schematic diagram of a structure of a liquid crystal display device in an embodiment of the present disclosure.
Figure 4:
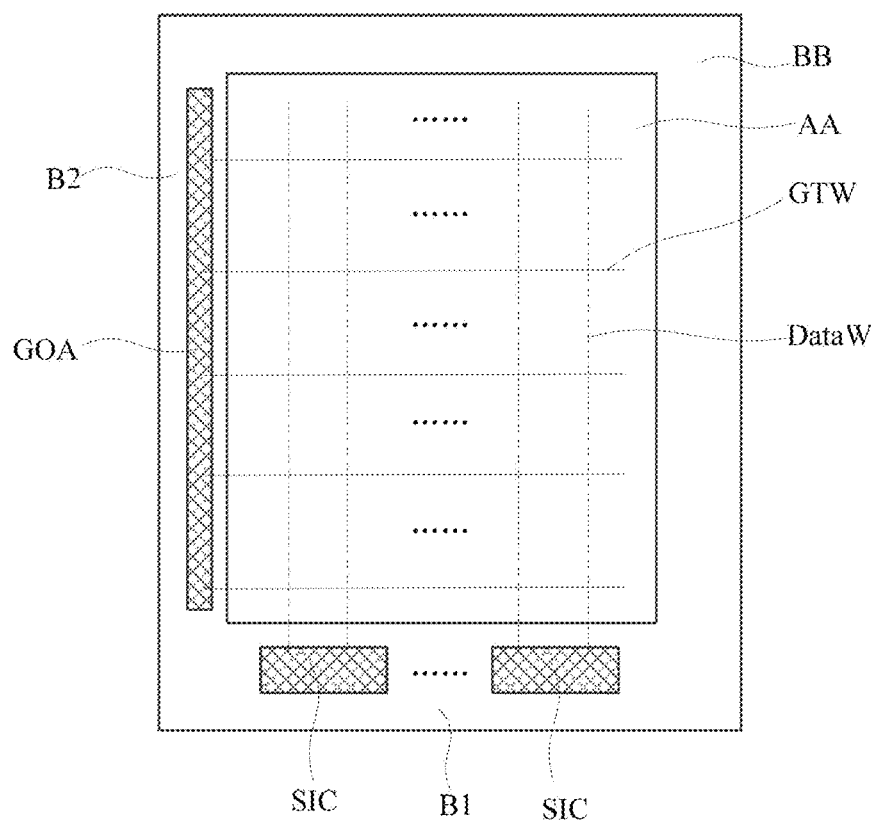
FIG. 4 is a schematic diagram of a structure of a liquid crystal display panel in an embodiment of the present disclosure.
Figure 5:
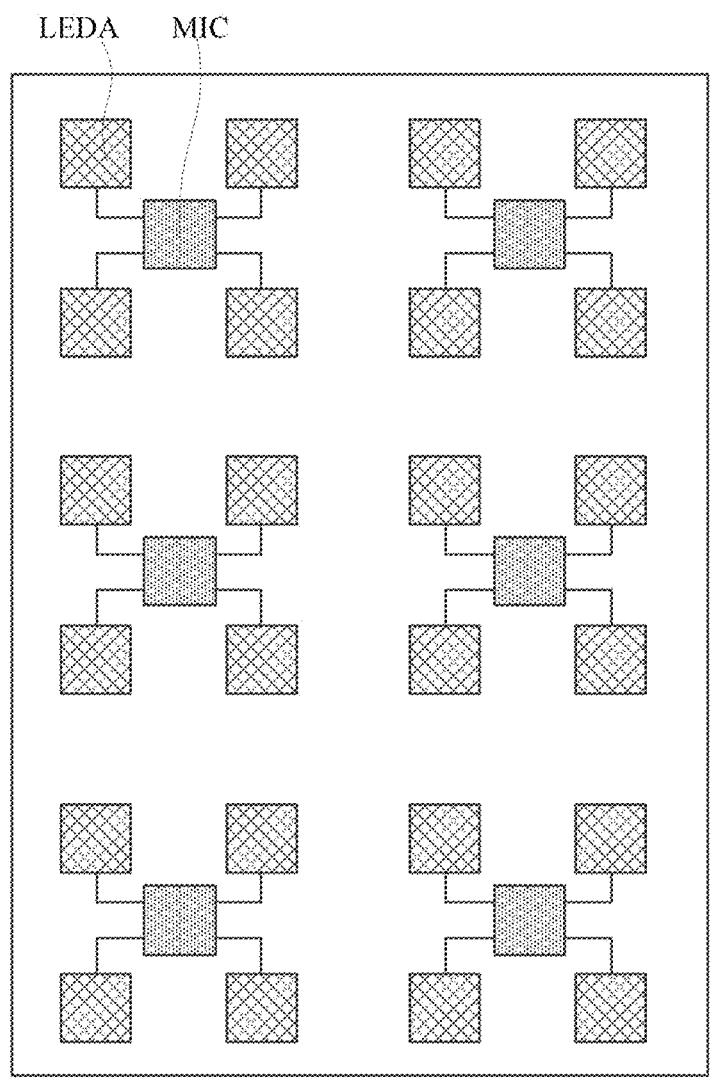
FIG. 5 is a schematic diagram of a structure of a backlight module in an embodiment of the present disclosure.

In general, after receiving the screen data, the screen driver board C-TCON needs only 0.5 frames of time to send the screen synchronization data at the earliest. However, the screen driver board C-TCON needs 2.5 frames of time to generate the local dimming data; the microprocessor MCU needs 1 frame of time to receive the local dimming data and send out the backlight drive data; and the backlight driver unit LEDD needs 0.5 frames of time to refresh the duty ratio of each light source according to the backlight drive data. This makes the brightness change of the backlight module BLU delayed by 3.5 frames of time compared with the screen change of the liquid crystal display panel PNL. Referring to FIG. 2, after accelerating the processing speed of local dimming data, when the system board C-SOC sends the data of the $N^{th}$ frame (Frame N) of the screen to the screen driver board C-TCON, the screen driver board C-TCON may send the data of the $(N-1)^{th}$ frame (Frame N-1) of the screen (i.e., the screen synchronization data) to the source driver circuit SIC, and send the data of the $(N-1)^{th}$ frame (Frame N-1) of the screen (i.e., the local dimming data) to the microprocessor MCU, and the microprocessor MCU sends the data of the (N-2) frame (Frame N-2) of the screen to the backlight driver unit LEDD (i.e., the backlight drive data). Therefore, even if the processing of the local dimming data is accelerated, the brightness change of the backlight module BLU is delayed by one frame of time compared to the screen change of the liquid crystal display panel PNL. In this case, the response speed of the liquid crystal display panel PNL is faster than the response speed of the backlight module BLU, and the display quality of the display device may be affected. For example, when the display device displays a dynamic Crosstalk (i.e., white block in the center with a black frame around it) screen with a small size of the white block, the user may perceive a delay in the darkening of the edges of the white block, causing discomfort to the human eye. In some embodiments, the screen synchronization data may be the same as the screen data, i.e., a vertical synchronization signal or a horizontal synchronization signal that carries a synchronization signal emitted by the screen driver board C-TCON. Referring to FIG. 3, the present disclosure provides a liquid crystal display device and a control module CTR thereof. The liquid crystal display device includes a liquid crystal display panel PNL, a backlight module BLU, and the control module CTR. Referring to FIGS. 4 and 5, the liquid crystal display panel PNL has a source driver circuit SIC for driving pixels, and the backlight module BLU has a plurality of light areas LEDA distributed in an array. In the present disclosure, the control module CTR is provided with an integrated board.

In some exemplary embodiments, the liquid crystal display panel PNL is a spliced display panel. Specifically, it includes a plurality of sub-display panels spliced together.

Figure 6:
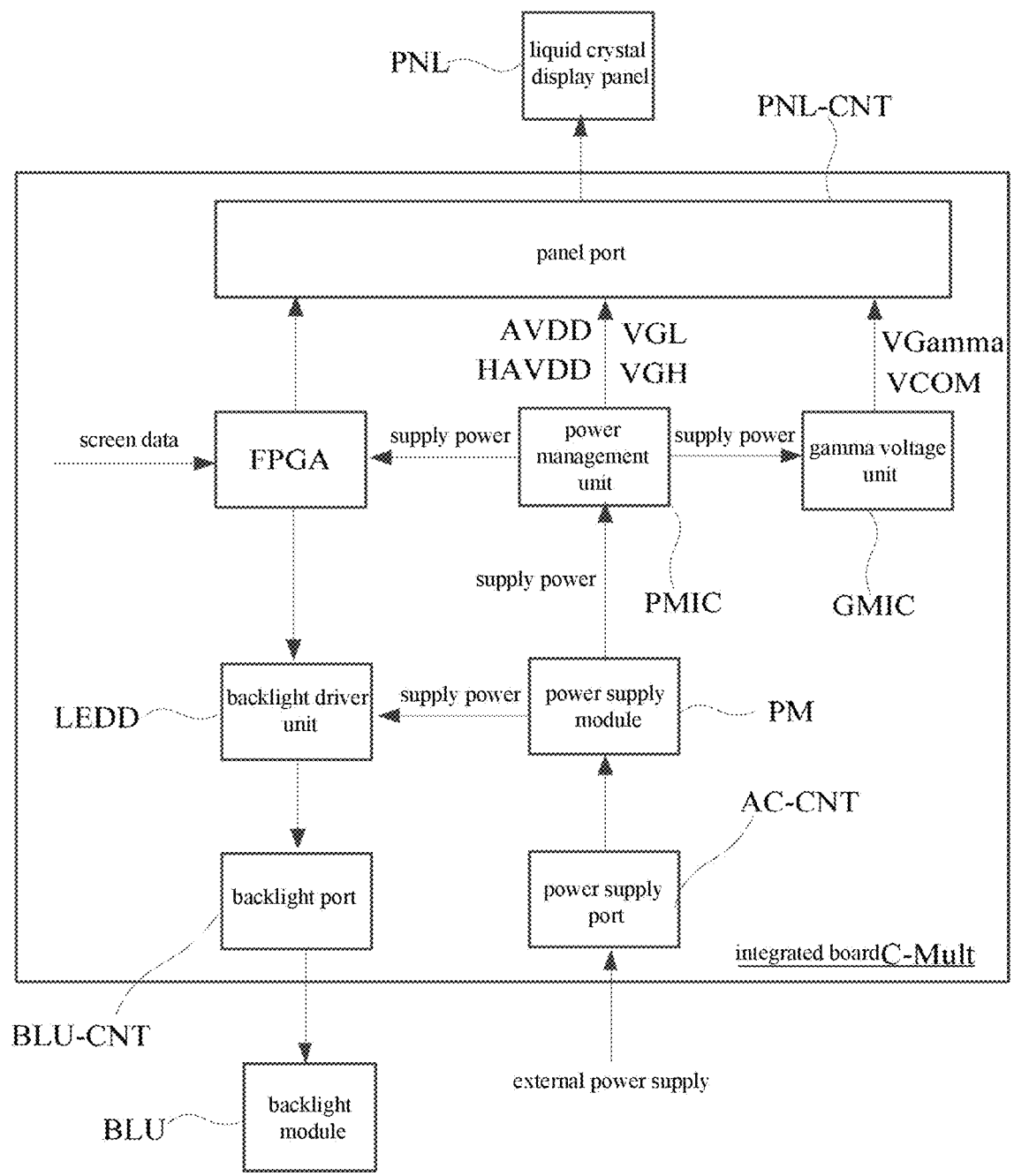
FIG. 6 is a schematic diagram of a local structure of an integrated board in an embodiment of the present disclosure.

Referring to FIG. 6, the integrated board C-Mult includes an FPGA (i.e., Field Programmable Gate Array) and a backlight driver unit LEDD on the same circuit board. The FPGA is configured to receive screen data, generate screen synchronization data based on the screen data and send the screen synchronization data to the liquid crystal display panel PNL, and to generate backlight drive data based on the screen data and send the backlight drive data to the backlight driver unit LEDD. The backlight driver unit LEDD is configured to receive the backlight drive data, and drive the backlight module directly based on the backlight drive data, with a delay of less than one frame of time from receiving the screen synchronization data. For example, the delay can be zero, or one-half of a frame of time, one-third of a frame of time, etc.

In some embodiments, the backlight driver unit LEDD is configured to, directly, drive the backlight module BLU based on the backlight drive data.

In the liquid crystal display device provided in the present disclosure, the integrated board adopts an FPGA in place of part of the functions of a conventional screen driver board C-TCON, which is capable of generating backlight drive data directly based on the screen data for driving the backlight driver unit LEDD. In this way, based on the screen data, the FPGA sends the backlight drive data to the backlight driver unit LEDD while sending the screen synchronization data to the source driver circuit SIC. The source driver circuit SIC drives the liquid crystal display panel PNL according to the screen synchronization data, and the backlight driver unit LEDD drives the backlight module BLU according to the backlight drive data, which synchronizes the response of the liquid crystal display panel PNL and the backlight module BLU, and overcomes the problem of low display quality (e.g., flickering) of certain screens caused by the faster response speed of the liquid crystal display panel PNL than that of the backlight module BLU.

In the related art, the local dimming data sent by the screen driver board C-TCON cannot be directly utilized by the backlight driver unit LEDD, and the local dimming data needs to be reprocessed by the microprocessor to generate the backlight drive data that can be directly utilized by the backlight driver unit LEDD.

In the present disclosure, the backlight driver unit LEDD directly drives the backlight module BLU based on the backlight drive data, meaning that the backlight drive data can be directly applied by the backlight driver unit LEDD without being reprocessed by a processing unit such as the microprocessor, and specifically applied to drive the backlight module. It should be understood that the connection between the FPGA and the backlight driver unit LEDD may be made directly via wires (e.g., a data wire or a serial data wire located on the circuit board), or via a transfer by another device (e.g., a driver, etc.), for the purpose of allowing the backlight drive data generated by the FPGA to be transmitted to the backlight driver unit LEDD. In the present disclosure, the backlight drive data received by the backlight driver unit LEDD and the backlight drive data output by the FPGA may have the same electrical signal. Specifically, the backlight drive data output from the FPGA is transmitted to the backlight driver unit LEDD without delay.

The structure, principles and effects of the display device of the present disclosure are further explained and illustrated in the following description in conjunction with the accompanying drawings.

From the viewpoint of the laminated structure, the liquid crystal display panel PNL may include an array substrate and a color film substrate sequentially laminated, and a liquid crystal box surrounded by a frame sealing adhesive is provided between the array substrate and the color film substrate, and liquid crystals are provided in the liquid crystal box. The liquid crystal display panel PNL further includes a first polarizer disposed on the side of the array substrate away from the color film substrate and a second polarizer disposed on the side of the color film substrate away from the array substrate. The array substrate is provided with a pixel electrode and a pixel driving circuit for loading a data voltage to the pixel electrode. The array substrate or the color film substrate is provided with a common electrode. By controlling the electric field strength between the pixel electrode and the common electrode, a degree of twisting or lodging of the liquid crystal within the corresponding range of the pixel electrode can be adjusted, thereby adjusting the direction of polarization of the polarized light passing through the liquid crystal, and ultimately adjusting the light emission rate of the liquid crystal display panel PNL within the corresponding range of the pixel electrode.

FIG. 4 illustrates a schematic diagram of a structure of a liquid crystal display panel PNL in an embodiment of the present disclosure. From a planar perspective, the liquid crystal display panel PNL may include a display area AA and a peripheral area BB surrounding the display area AA. In the display area AA, the array substrate is provided with gate wires GTW extending in the row direction and data wires DataW extending in the column direction, and the gate wires GTW and the data wires DataW define a plurality of pixel areas in which the pixel electrode and the pixel driving circuit may be disposed. In an example, the pixel driving circuit may be a thin-film transistor serving as a switching transistor, one end of the switching transistor being electrically connected to the data wire DataW, the other end of the switching transistor being connected to the pixel electrode, and the gate of the switching transistor being connected to the gate wire GTW. The peripheral area BB of the array substrate has a first peripheral area B1 in which the source driver circuit SIC is bonded, and a second peripheral area B2 in which the gate driver circuit GOA is provided, wherein the first peripheral area B1 is disposed at an end of the array substrate in the column direction, and the second peripheral area B2 is disposed at an end of the array substrate in the row direction. The gate driver circuit GOA is electrically connected to each gate wire GTW and is configured to load a scanning signal that turns the switching transistor on to the gate wire GTW. The source driver circuit SIC is electrically connected to the data wire DataW, and is configured to generate a data voltage based on the screen synchronization data and load the data voltage to the data wire DataW.

Referring to FIG. 4, in this example, there are multiple source driver circuits SIC of the liquid crystal display panel PNL, and each source driver circuit SIC may drive multiple data wires DataW separately. Further, the source driver circuits SIC are chips; the array substrate is provided with a FPC bonding area and a SIC bonding area in the first peripheral area B1. The source driver circuit SIC can be bonded in the SIC bonding area, and the SIC bonding area is electrically connected to the data wire DataW and the FPC bonding area through the wires, respectively. The FPC bonding area can be bonded and connected to the integrated board through a Flexible Printed Circuit (FPC). In this way, the signals and voltages on the integrated board can be transmitted to the source driver circuit SIC through the FPC. Further, the signals between the source driver circuit SIC and the integrated board can be Low Voltage Differential Signaling (LVDS) signals or mini LVDS signals to minimize signal crosstalk.

Of course, in other embodiments of the present disclosure, the liquid crystal display panel PNL may also be presented in other structures. For example, the gate driver circuit GOA does not have to be provided on the array substrate, instead, a gate driver circuit board is bonded to the array substrate. For another example, the array substrate is provided with gate driver circuits GOA on both sides in the row direction to reduce the voltage drop of the scanning signal or to increase the scanning frequency. For yet another example, the source driver circuits SIC are provided on both sides of the array substrate in the column direction to drive the liquid crystal display panel PNL on both sides to reduce the voltage drop on the data wire DataW in the large-size liquid crystal display panel PNL, especially to reduce the voltage drop on the data wire DataW in the splicing screen. For still another example, the source driver circuit SIC may be provided on a Chip On Film (COF) instead of the liquid crystal display panel PNL. The present disclosure does not limit the relative positional relationship and arrangement form between the source driver circuit SIC and the display panel PNL, so long as the source driver circuit SIC is capable of directly driving each pixel in the display area of the liquid crystal display panel PNL.

In the embodiments of the present disclosure, the backlight module BLU is a direct-type backlight source. Referring to FIG. 5, the direct-type backlight source includes a light panel having light areas LEDA distributed in an array, each of which has one or more light-emitting elements (e.g., Mini LEDs or microchip Micro LEDs) controlled synchronously. Under the control of the backlight driver unit LEDD, the luminous brightness of each light area LEDA can be controlled independently to cooperate with the screen displayed by the liquid crystal display panel PNL and improve the display effect of the display device. In one example, the backlight driver unit LEDD controls the luminous brightness of each light area LEDA by controlling the duty ratio of each light-emitting element when it emits light.

In one example, referring to FIG. 5, a microchip MIC can be provided on the light panel, and each microchip MIC can control one or more light areas LEDA, for example, one microchip MIC can control one light area LEDA or four light areas LEDA. The backlight driver unit LEDD can send light area data of each light area controlled by each microchip MIC to each microchip MIC, and according to the light area data, the microchip MIC determines the power-on time of each light area LEDA under its control, and then controls the duty ratio of each light area LEDA. In other words, the backlight driver unit LEDD can refresh the duty ratio of each light area by loading the light area data to each microchip MIC. Further, the light-emitting elements of each light area LEDA have basically the same brightness when emitting light, i.e., the current flowing through each light-emitting element is basically the same.

For example, in one embodiment, the light panel is provided with a control unit, a light area power supply wire, a light area ground line and a data wire, etc. Each control unit may include a microchip MIC and light areas LEDA controlled by the microchip MIC, and each light area LEDA includes a light-emitting element or a plurality of light-emitting elements. The plurality of light-emitting elements can be connected in parallel or in series, or in a hybrid parallel/series connection. A first power supply terminal of the light area LEDA is electrically connected to the light area power supply wire. A second power supply terminal of the light area LEDA is electrically connected to a control pin of the microchip MIC. The light area power supply wire can be loaded with a more stable drive voltage (ACC), and the light area ground wire can be loaded with a ground voltage (GND). When the microchip MIC controls more than one light area LEDA, each light area LEDA is connected to a different control pin. The microchip MIC connects the data wire and the light area ground wire for receiving the light area data from the backlight driver unit LEDD via the data wire, and controlling the electrical connection relationship between each control pin and the light area ground wire according to the received light area data. Under the control of the microchip MIC, when the control pin is electrically connected to the light area ground wire, the light-emitting elements in the light area LEDA connected to the control pin are in a conductive state, and the current in the light area power supply wire flows through the light-emitting elements to the light area ground wire, which makes the light-emitting elements emit light at a substantially constant current. Under the control of the microchip MIC, when the control pin is disconnected from the light area ground wire, the light-emitting elements in the light area LEDA connected to the control pin are in a disconnected state, and the current on the light area power supply wire can not flow through the light-emitting elements to the light area ground line, which makes the light-emitting elements do not emit light. In this way, the microchip MIC, under the control of the light area data, can control the duty ratio of each light-emitting element in the light area LEDA by controlling the ratio of the electrical conduction and disconnection of each control pin, so that the final effect is reflected in the control of the macro-brightness of each light area LEDA. In this embodiment, the backlight driver unit LEDD also needs to load the microchip MIC with an operating voltage for enabling the microchip MIC to operate. In this case, the light panel may additionally be provided with a chip power supply line for loading the microchip MIC with the operating voltage, or the microchip MIC may be loaded with the operating voltage via a data wire. For example, the data wire may be multiplexed as the chip power supply wire to simultaneously load the microchip MIC with the operating voltage and the light area data using power line carrier communication technology.

In one example, the light panel can be provided with sensors, such as temperature sensors, brightness sensors, etc. The sensing signals generated by these sensors can be directly sent to the backlight driver unit LEDD or forwarded to the backlight driver unit LEDD through the microchip MIC. The backlight driver unit LEDD can directly adjust the working state or working process of the the backlight module BLU according to these sensing signals, or feedback these sensing signals to the FPGA, by which the backlight drive data is adjusted according to these sensing signals.

In one example, the light panel may include a substrate, a driver layer, and a component layer stacked in sequence. The driver layer is provided with at least two wiring metal layers, such as two wiring metal layers containing copper. The wiring metal layers are isolated by an insulating layer, and the insulating layer may be an inorganic insulating layer (e.g., silicon nitride or silicon oxide) or an organic insulating layer (e.g., a resin), or may be the inorganic insulating layer and the organic insulating layer that are stacked. The wiring metal layers may be connected to each other through a via hole penetrating the insulating layer. The surface of the wiring metal layer away from the substrate may be formed with one or more bonding pads for bonding electronic components, such as light-emitting elements, microchips, and sensors.

In one example, the substrate of the light panel may be a glass substrate. Further, the light panel may be formed by a plurality of sub-light panels spliced together. The sub-light panels are electrically connected to each other, or each one of the sub-light panels is independent and directly controlled by the backlight driver unit LEDD.

In one example, the respective light-emitting elements have the same light-emitting color, for example, they are all blue light-emitting elements. A photoluminescent layer, e.g., a quantum dot film, is also provided on the light panel to convert the blue light into a more uniform white light.

In some examples, the backlight module BLU may also be provided with one or more of: a collimation film, a bandpass filter film, a diffusion sheet, a brightening sheet, or other optical film materials, without limitation of the present disclosure.

It should be understood that the backlight module BLU of the embodiments of the present disclosure may also adopt other structures, such as adopting a light bar to form the light panel, which is not limited by the present disclosure.

In some embodiments, referring to FIG. 6, the integrated board is further provided with a power supply module PM, a power management unit PMIC and a gamma voltage unit GMIC on the circuit board of the integrated board, in addition to the FPGA and the backlight driver unit LEDD on the same circuit board. The power supply module PM is used to connect to an external power supply and to supply power to the power management unit PMIC and the backlight driver unit LEDD. The power management unit PMIC is configured to supply a plurality of different supply voltages to the liquid crystal display panel PNL and to supply power to the gamma voltage unit GMIC. The gamma voltage unit GMIC is configured to provide the liquid crystal display panel PNL with a common voltage VCOM and a gamma binding point voltage VGamma corresponding to each binding point's gray scale. The FPGA is powered by the power supply module PM or the power management unit PMIC. In this way, the integrated board of the present disclosure can at least realize the functions of the screen driver board C-TCON, the power supply board C-Power, and the conversion board C-CONV in the related art, which can reduce the number of boards in the control module CTR, and thus improve the integration of the control module CTR and improve the assembly efficiency of the display device.

In addition, the units with the same functions originally installed on the screen driver board C-TCON, power supply board C-Power and conversion board C-CONV, can be merged or multiplexed with each other, thus avoiding the waste of resources and increased cost due to the setting of units with the same functions in the control module CTR, and effectively simplifying the structure of the control module CTR and reducing the cost of the control module CTR. For example, in the related art, the screen driver board C-TCON and the conversion board C-CONV may both have units related to the local area dimming function. The functions of these units may overlap, resulting in a waste of resources. The power supply board C-Power and the conversion board C-CONV may both have units related to the light area power supply voltage (ACC, which is used to provide the drive voltage to the light area) for driving the light area, and the functions of these units overlap, resulting in a waste of resources. In the embodiments of the present disclosure, these units, which are originally distributed on different boards and have overlapping or related functions, can be merged, simplified, or realized through the FPGA, thereby reducing the number of functional units in the control module CTR to reduce the waste and increased cost due to overlapping functions.

In the related art, boards need to be connected to each other by wires and connectors (ports), which is not only complicated in terms of wiring but also costly. The units of the integrated board of the present disclosure are set on the same circuit board, and there is no need to connect the various functional units through wires, so that the integrated board of the present disclosure has the advantage of high integration and low cost. This also makes the integrated board of the present disclosure more neat and tidy as a whole, which is conducive to improving the assembly efficiency of the control module CTR. Furthermore, the integrated board of the present disclosure has a smaller board area than the previous multiple boards, which is conducive to reducing the size and cost of the display device, and is conducive to the thinning and lightening of the display device.

Referring to FIG. 6, in some embodiments of the present disclosure, the power management unit PMIC may supply power to the FPGA, e.g., by providing a voltage of 3.3V as the operating voltage of the FPGA. Of course, in other embodiments of the present disclosure, the FPGA can be powered by the power supply module PM instead of the power management unit PMIC, i.e., the power supply module PM can supply power directly to the FPGA (as shown by a dashed arrow in FIG. 11).

In one embodiment, the integrated board further includes a power supply selection unit. The power supply selection unit is configured to select one of the power supply module PM and the power management unit PMIC to supply power to the FPGA. For example, the power supply selection unit may monitor the power consumption of the power management unit PMIC. When the power consumption of the power management unit PMIC is greater than preset power consumption, the power supply selection unit selects the power supply module PM to supply power to the FPGA. When the power consumption of the power management unit PMIC is less than the preset power consumption, the power supply selection unit selects the power management unit PMIC to supply power to the FPGA.

In one embodiment of the present disclosure, referring to FIG. 6, the integrated board includes a circuit board and an FPGA, a power management unit PMIC, a gamma voltage unit GMIC, a power supply module PM, and a backlight driver unit LEDD installed on the circuit board, and there are also provided on the circuit board a panel port PNL-CNT for connecting to a liquid crystal display panel PNL, a backlight port BLU-CNT for connecting to a backlight module BLU, and a power supply port AC-CNT for connecting to an external power supply. Depending on the distribution of the bonding pads on the liquid crystal display panel PNL, there may be one or more panel ports, e.g., two panel ports. Depending on the distribution of the bonding pads on the light panel of the backlight module BLU, there may be one or more backlight ports, e.g., nine backlight ports. Each backlight port may control one or more signal channels on the backlight module BLU, with a plurality of light areas LEDA provided within each signal channel, such as a plurality of light areas LEDA controlled by sequentially cascaded microchip MICs. Optionally, the panel port or the backlight port may include sequentially arranged pads or connectors for plugging, or other feasible structures.

Figure 9:
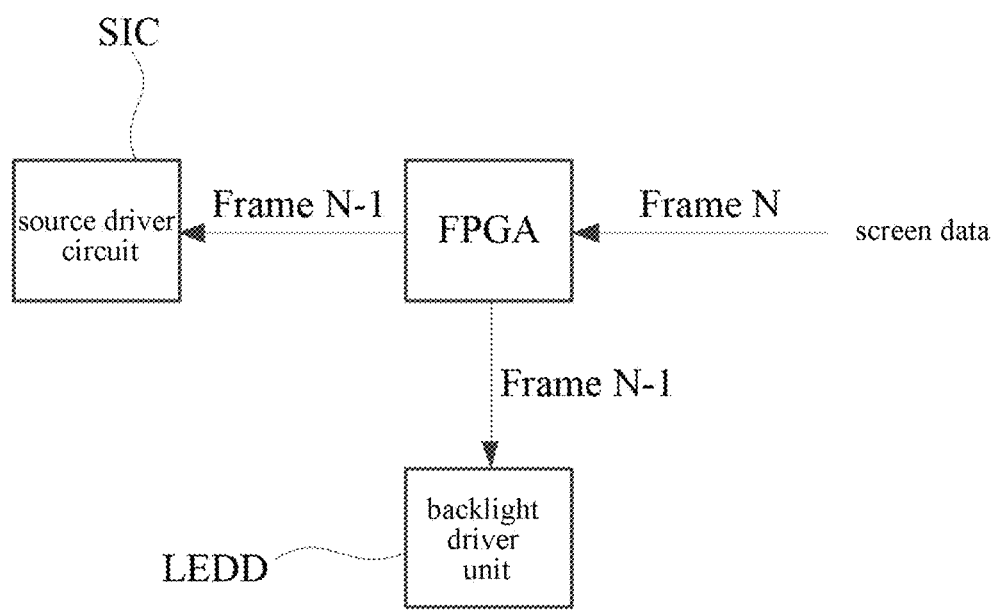
FIG. 9 is a schematic diagram of a driving process of a control module in an embodiment of the present disclosure.

Referring to FIG. 6 and FIG. 9, the FPGA can adopt the strategy of caching one frame and sending one frame to improve the response synchronization of the liquid crystal display panel PNL and the backlight module BLU. Specifically, when receiving the screen data of the $(N-1)^{th}$ frame, the FPGA can cache and process it first, and can send the data of the $(N-1)^{th}$ frame when receiving the screen data of the N frame. At the time of sending, the FPGA can send the screen synchronization data of the $(N-1)^{th}$ frame to the source driver circuit SIC so that the source driver circuit SIC can directly drive the liquid crystal display panel PNL according to the screen synchronization data of the $(N-1)^{th}$ frame, and send the backlight drive data of the $(N-1)^{th}$ frame to the backlight driver unit LEDD so that the backlight driver unit LEDD can directly drive the backlight module BLU according to the backlight drive data of the $(N-1)^{th}$ frame. In this way, the liquid crystal display panel PNL and the backlight module BLU process the data of the $(N-1)^{th}$ frame at the same time to synchronize the response. In this method, there is no need for the FPGA to send the backlight synchronization data first and then for the other units to generate the backlight drive data based on the backlight synchronization data, thus avoiding the response desynchronization.

In some embodiments of the present disclosure, the integrated board further includes a storage module for storing a program, configuration information, and buffered data. In one example, the storage module is a storage circuit located on the circuit board. In another example, the storage module is a storage unit of the field programmable gate array. In yet another example, the storage module includes the storage unit of the field programmable gate array and the storage circuit located on the circuit board. In the example in which the storage circuit is provided, by introducing the storage circuit outside the field programmable gate array as part of the storage module, the constraints imposed by the size of the storage unit of the field programmable gate array on the functions of the field programmable gate array can be reduced, and space can be reserved for subsequent function upgrade of the integrated board.

In some embodiments of the present disclosure, the storage module is configured to store configuration information for the backlight driver unit, debugging interface configuration, at least part of programs for the field programmable gate array.

The field programmable gate array is configured to generate, based on the screen data, the screen synchronization data and backlight synchronization data, and to cache the screen synchronization data and the backlight synchronization data to the storage module.

The field programmable gate array is further configured to forward the screen synchronization data in the storage module to the liquid crystal display panel, to generate the backlight drive data based on the backlight synchronization data and the configuration information of the backlight driver unit in the storage module, and to send the backlight drive data to the backlight driver unit.

The field programmable gate array is further configured to invoke the debugging interface configuration in response to a debugging signal and cause the liquid crystal display device to display a debugging interface.

Figure 10:
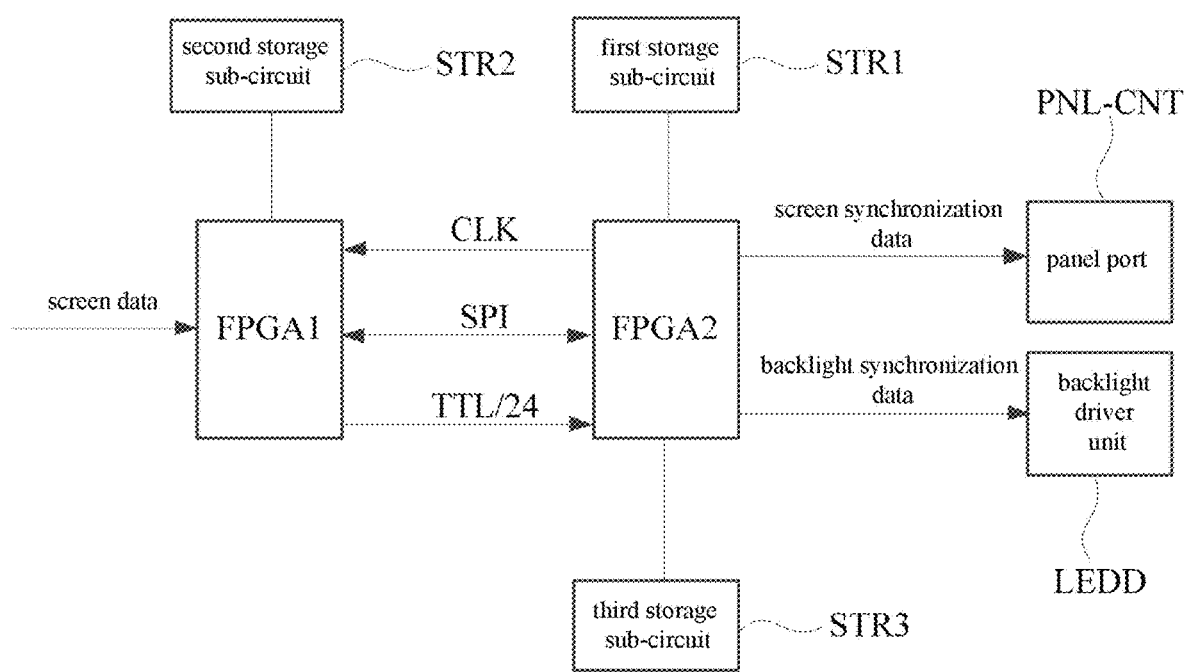
FIG. 10 is a schematic diagram of an interaction between an FPGA and a memory circuit in an integrated board in an embodiment of the present disclosure.

In one embodiment of the present disclosure, referring to FIG. 10, the storage circuit includes a first storage sub-circuit STR1 located on the circuit board, the first storage sub-circuit STR1 being configured to interact with the FPGA. The first storage sub-circuit STR1 is configured to store information such as synchronization data and the configuration information of the backlight driver unit LEDD. The FPGA is configured to generate, based on the screen data, the screen synchronization data and the backlight synchronization data, and to cache the screen synchronization data and the backlight synchronization data to the first storage sub-circuit STR1. The FPGA is further configured to forward the screen synchronization data in the first storage sub-circuit STR1 to the liquid crystal display panel PNL, to generate the backlight drive data based on the backlight synchronization data and the configuration information of the backlight driver unit LEDD in the first storage sub-circuit STR1, and to send the backlight drive data to the backlight driver unit LEDD. In this way, after receiving the screen data, the FPGA can generate the synchronization data (including the screen synchronization data and the backlight synchronization data) based on the screen data and cache the synchronization data in the first storage sub-circuit STR1. Then, the screen synchronization data (in some cases, the screen synchronization data is the screen data) can be read from the first storage sub-circuit STR1 and sent to the panel port set on the integrated board, and further the screen synchronization data can be transmitted to the source driver circuit SIC. The FPGA may invoke or call the backlight synchronization data and the configuration information of the backlight driver unit LEDD stored in the first storage sub-circuit STR1, thereby generating the backlight drive data that can be used to directly control the backlight driver unit LEDD, and sending the backlight drive data to the backlight driver unit LEDD.

In one embodiment of the present disclosure, referring to FIG. 10, the storage circuit includes a second storage sub-circuit STR2 located on the circuit board, the second storage sub-circuit STR2 storing a debugging interface configuration for the display device. The FPGA is further configured to invoke the debugging interface configuration in response to a debugging signal and cause the display device to display a debugging interface. After the FPGA receives the debugging signal, it can, in addition to debugging the display device in response to the debugging signal, call up the debugging interface configuration to generate the debugging interface and control the backlight module BLU and the liquid crystal display panel PNL to display the debugging interface.

In one embodiment of the present disclosure, referring to FIG. 10, the storage circuit includes a third storage sub-circuit STR3 located on the circuit board. The third storage sub-circuit STR3 can be used to store some or all of the programmed data (programs) of the FPGA in order to avoid that the internal static storage unit of the FPGA has insufficient storage capacity to constrain the function of the FPGA.

It will be understood that the storage circuit of the present disclosure may include one, two, or all of the first storage sub-circuit STR1, the second storage sub-circuit STR2, and the third storage sub-circuit STR3 described above. For example, in the exemplary embodiment of FIG. 10, the storage circuit includes the first storage sub-circuit STR1, the second storage sub-circuit STR2, and the third storage sub-circuit STR3. In other exemplary embodiments of the present disclosure, the storage circuit may include other storage sub-circuits for implementing other functions or for reserving storage redundancy for functional upgrades of the integrated board. In the present disclosure, the individual storage sub-circuits may be at different locations in the same memory (e.g., for different partitions) or they may be the same memory, which is not limited by the present disclosure. In other embodiments, the storage sub-circuits may also be external memories that are connected to the FPGA via an interface, so that the hardware of the integrated board can be upgraded by replacing the external memory, providing versatility of the integrated board.

In some embodiments of the present disclosure, two or more FPGAs interacting with each other may be provided on the integrated board to avoid insufficient functionality of a single FPGA. When multiple FPGAs are provided, any two FPGAs may be the same or different. Further, when multiple FPGAs are provided, the individual FPGAs may perform different tasks. In one example, along the direction of information transmission of the screen data, the last-stage FPGA is configured to load the screen synchronization data to the panel port and to load the backlight drive data to the backlight driver unit LEDD.

In one example, the integrated board is provided with two FPGAs, namely, a first field programmable gate array (FPGA1) and a second field programmable gate array (FPGA2). FPGA1 is connected to the second storage sub-circuit STR2 and FPGA1 is configured to receive the screen data and forward the screen data to FPGA2. FPGA1 may also be configured to receive a debugging signal and, after receiving the debugging signal, may invoke a debugging interface configuration stored in the second storage sub-circuit STR2 and generate debugging interface data, which is sent to FPGA2 as a kind of screen data. FPGA2 is configured to generate the screen synchronization data and the backlight drive data according to the screen data. FPGA2 is further configured to send the screen synchronization data to the liquid crystal display panel PNL and to send the backlight drive data to the backlight driver unit LEDD within the same frame of time.

For example, after receiving the screen data, FPGA2 may parse out the synchronization data (including the screen synchronization data and the backlight synchronization data) from the screen data and cache the synchronization data in the first storage sub-circuit STR1. FPGA2 may also send the screen synchronization data to the panel port (e.g., in the form of MiniLVDS signals), and the source driver circuit SIC may obtain the screen synchronization data by receiving the signals (e.g., MiniLVDS signals) sent from the panel port. Within the same frame of time, FPGA2 may also call the configuration information of the backlight driver unit LEDD and the backlight synchronization data stored in the first storage sub-circuit STR1 to generate the backlight drive data for directly controlling the backlight driver unit LEDD, which is sent to the backlight driver unit LEDD (e.g., sent via a serial peripheral interface SPI). It will be understood that, in the above example, FPGA2 and the source driver circuit SIC may communicate with each other by using other signals, such as LVDS signals. FPGA2 and the backlight driver unit LEDD may communicate with each other by using other signals, such as transistor-transistor logic (TTL) signals, and the like.

Optionally, referring to FIG. 10, the third storage sub-circuit STR3 can interact with FPGA2 to enable FPGA2 to perform more complex operations, as well as to process the screen data and generate the backlight drive data more efficiently and quickly.

Optionally, referring to FIG. 10, FPGA2 can also send a clock signal CLK to FPGA1, e.g., to a digital clock management module of FPGA1, enabling clock synchronization between FPGA1 and FPGA2.

Optionally, FPGA1 and FPGA2 can interact with each other using SPI signals or TTL signals. For example, when the screen data received by FPGA1 is a TTL signal, FPGA1 can forward the screen data to FPGA2 via a TTL signal, and in one example, the screen data is transmitted as a 24-channel TTL signal.

Optionally, FPGA can use SPI signals to send the backlight drive data to the backlight driver unit LEDD.

The above examples exemplify the integrated board in terms of the number of FPGAs being two and the number of storage sub-circuits being three. In other embodiments of the present disclosure, the number of FPGAs may be three or more, or only one FPGA may be provided. The number of storage sub-circuits may be more or less, for example, four or five storage sub-circuits may be provided.

Referring to FIG. 6, the power supply module PM can be connected to the power supply port to receive an external power source (e.g., commercially available AC power) and power the components on the integrated board.

Optionally, the power supply module PM may be a wide-voltage power supply component that can be adapted to a wide range of input voltages, e.g., input voltages in the range of 70V~300V. In one example, the input voltage of the power supply module PM can be adapted in the range of 90V~264V.

Optionally, the power supply module PM can be adapted to a rated input current of no more than 3A. For example, the power supply module PM is adapted to a rated input current of around 2A.

Optionally, the power supply module PM may provide power to the power management unit PMIC, e.g. by providing a constant voltage of around 12V. Further, the rated current provided to the power management unit PMIC is not more than 1.5 A.

Optionally, the power supply module PM may provide power to the backlight driver unit LEDD, e.g., by providing a constant voltage in the range of 10V to 20V. Further, the rated current of the power supplied by the power supply module PM to the backlight driver unit LEDD is no more than 8.5 A.

In one example, the power supply module PM provides power to the backlight driver unit LEDD, a portion of which may be transferred directly to the backlight port so that power is supplied through the backlight port directly to the light panel of the backlight module BLU. In other words, the power supply module PM can provide power to the light panel via the backlight port with the help of the wires of the backlight driver unit LEDD. The backlight driver unit LEDD is configured to directly or indirectly control the duty ratio of each light-emitting device on the light panel.

Optionally, the backlight driver unit LEDD can collect the voltage at the output terminal of the backlight module BLU and adjust the voltage loaded to the input terminal of the backlight module BLU from the power supply module PM according to the voltage at the output terminal of the backlight module BLU to ensure that the drive voltage (ACC) loaded to the light area LEDA of the backlight module BLU is stable, which is conducive to the realization of the constant-current driving of the light-emitting elements.

The following example illustrates one implementation of a power supply module PM on the integrated board according to embodiments of the present disclosure. It will be understood that the power supply module PM of the embodiments of the present disclosure is not limited to the following example.

Figure 15:
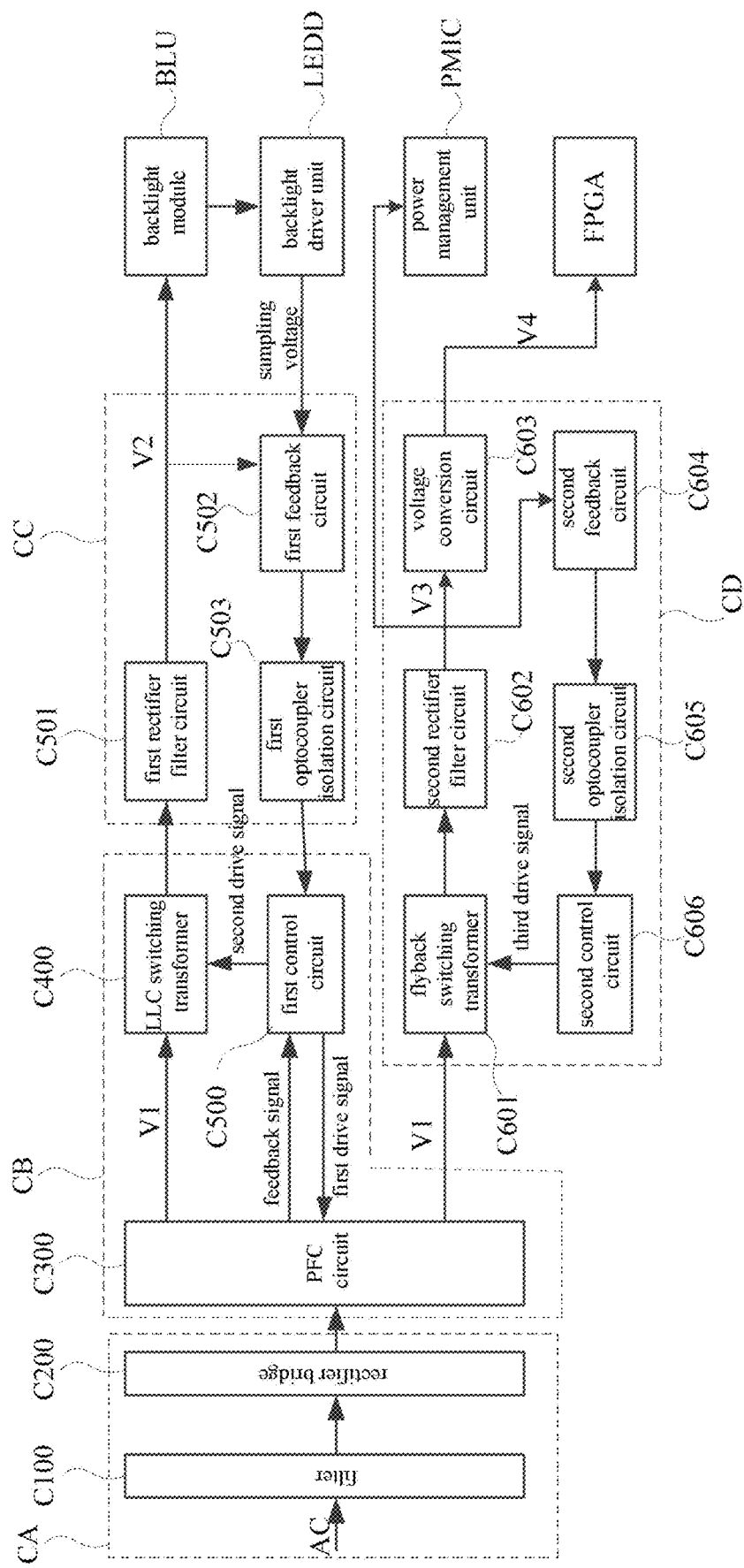
FIG. 15 is a schematic diagram of a structure of a power supply module in an embodiment of the present disclosure.

In this example, referring to FIG. 15, the power supply module PM includes a rectifier filter unit CA, a voltage regulating unit CB, a backlight power supply unit CC, and a board power supply unit CD.

Referring to FIG. 15, the rectifier filter unit CA may include a filter C100 connected to the power supply port and a rectifier bridge C200 cascaded with the filter C100 to rectify the external AC power to direct current. Optionally, the filter C100 is an electromagnetic interference (EMI) filter.

The voltage regulating unit CB includes a PFC circuit C300, and an LLC switching transformer C400 and a first control circuit C500. The input terminal of the PFC circuit C300 is connected to the output terminal of the rectifier bridge C200; and the first control circuit C500 samples the output terminal of the PFC circuit C300 or a node within the circuit to obtain a feedback signal and generates a first drive signal to regulate the PFC circuit C300 according to the feedback signal provided by the PFC circuit C300, so that the PFC circuit C300 outputs a stable DC voltage V1 under the regulation of the first control circuit C500. The input terminal of the LLC switching transformer C400 is electrically connected with the output terminal of the PFC circuit C300, and the control terminal of the transformer C400 is connected to the first control circuit C500. The LLC switching transformer C400 is configured to output a voltage to the backlight power supply unit CC under the control of a second drive signal from the first control circuit C500. In one example, the voltage value of the DC voltage V1 may be in the range of 350~450 V, for example, 400 V.

The backlight power supply unit CC includes a first rectifier filter circuit C501, a first feedback circuit C502, and a first optocoupler isolation circuit C503, wherein the input terminal of the first rectifier filter circuit C501 is connected to the output terminal of the LLC switching transformer C400 for rectifying the voltage signal inputted by the LLC switching transformer C400 to a DC voltage V2. In one example, the DC voltage V2 is within the range of 10~20 V, e.g., 13.4 V. The first control circuit C500 can adjust the output of the LLC switching transformer C400 through the second drive signal, and thus adjust the voltage value of the DC voltage V2 after being filtered and rectified by the first rectifier filter circuit C501. The output terminal of the first rectifier filter circuit C501 may be connected to the backlight module BLU, in particular to the upstream (i.e., the end of the circuit close to the positive terminal of the battery) of the power supply wire of the light area (which is used to load the drive voltage to the light-emitting elements in the light area) of the backlight module BLU, so as to provide the drive voltage (ACC) to the various light-emitting elements of the backlight module BLU. The backlight driver unit LEDD can sample the voltage on the backlight module BLU to obtain the sampling voltage. The first feedback circuit C502 compares the sampling voltage with the DC voltage V2 to form a feedback signal, which is fed back to the first control circuit C500 through the first optocoupler isolation circuit C503, and the first control circuit C500 regulates the second drive signal based on the feedback of the first optocoupler isolation circuit C503. In this way, the operating state of the LLC switching transformer C400 can be made to match the changes in the load on the backlight module BLU, so as to improve the operating stability of the backlight module BLU and the accuracy of the backlight.

The board power supply unit CD includes a flyback switching transformer C601, a second rectifier filter circuit C602, a voltage conversion circuit C603, a second feedback circuit C604, a second optocoupler isolation circuit C605, and a second control circuit C606. The input terminal of the flyback switching transformer C601 is connected to the output terminal of the PFC circuit C300 for outputting a voltage signal to the second rectifier filter circuit C602 under the control of a third drive signal provided by the second control circuit C606. The second rectifier filter circuit C602 rectifies and filters the voltage signal output from the flyback switching transformer C601 to form a DC voltage V3, which can be directly provided to the power management unit PMIC as a power source of the power management unit PMIC. The voltage conversion circuit C603 can reduce the DC voltage V3 to a DC voltage V4, which can be used as the power source of the FPGA. Of course, in other embodiments of the present disclosure, the FPGA may also be powered by the power management unit PMIC, in which case the output terminal of the voltage conversion circuit C603 may not be electrically connected to the FPGA, or the power supply module PM may not be equipped with the voltage conversion circuit C603. The second feedback circuit C604 can sample the DC voltage V3 and generates a feedback signal, which is fed to the second control circuit C606 via the second optocoupler isolation circuit C605, so that the second control circuit C606 can adjust the third drive signal according to the feedback signal to maintain the stability of the DC voltage V3. In one example, the DC voltage V3 may be in the range of 10V to 18V, such as 12V. In one example, the DC voltage V4 may be in the range of 2V to 6V, such as 3.3V.

In the above example of the present disclosure, the power management unit PMIC may not supply power to the FPGA. Instead, power is supplied to the FPGA directly by the power supply module PM to avoid excessive power consumption of the power management unit PMIC. In other examples of the present disclosure, referring to FIG. 6, the power supply module PM may supply power to the power management unit PMIC, and the power management unit PMIC may supply power to the FPGA.

Figure 11:
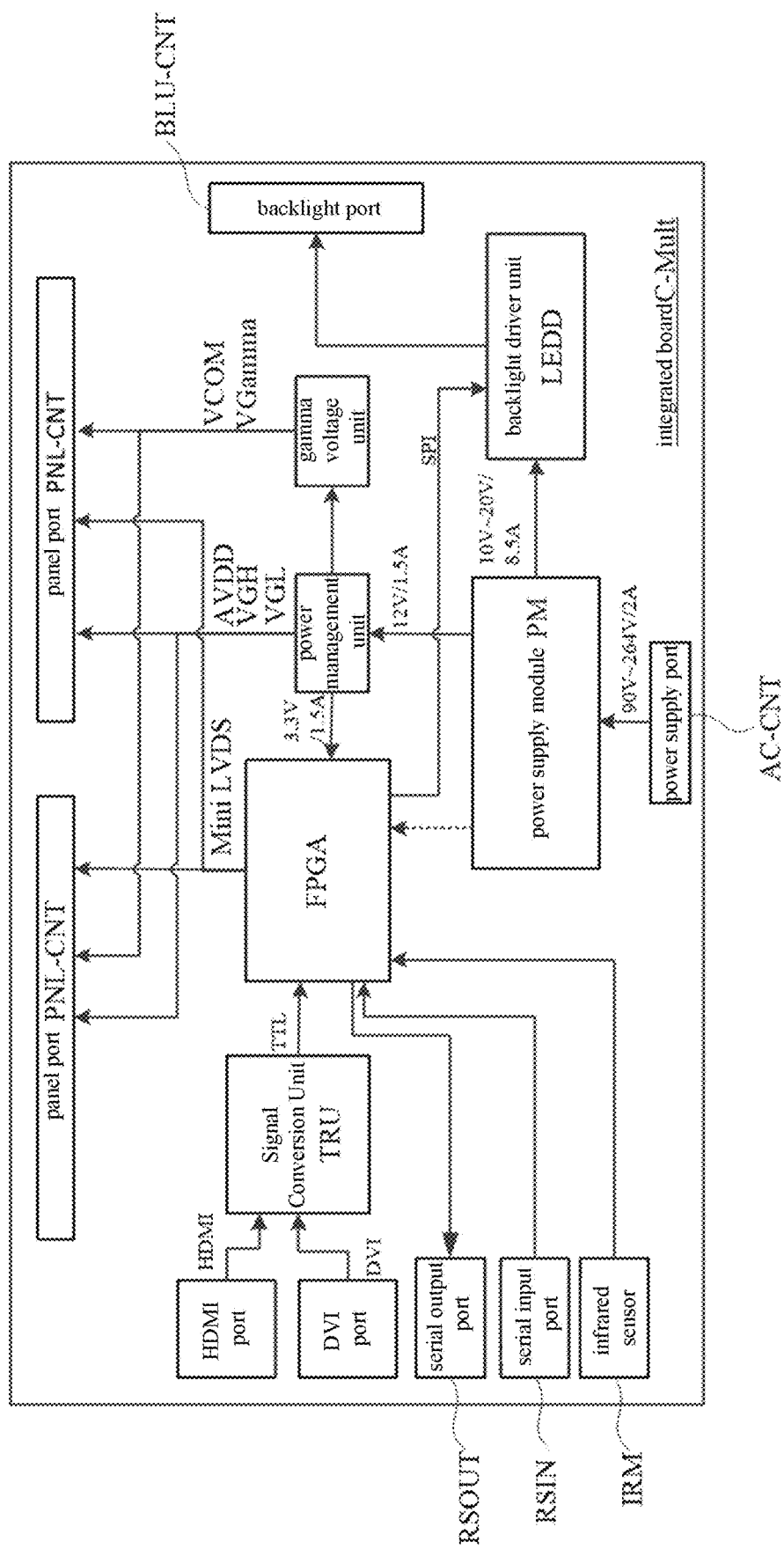
FIG. 11 is a schematic diagram of a structure of an integrated board with a communication module in an embodiment of the present disclosure.

Referring to FIG. 11, the power management unit PMIC can generate an analog voltage AVDD and provide it to the liquid crystal display panel PNL through the panel port, which is used as the power source of some devices in the liquid crystal display panel PNL, such as the source driver circuit SIC in the liquid crystal display panel PNL. The power management unit PMIC can also generate and supply a VGL voltage (gate drive low level) and a VGH voltage (gate drive high level) to the liquid crystal display panel PNL through the panel port. The power management unit PMIC can also generate HAVDD (i.e., half of the AVDD voltage) and provide it to the gamma voltage unit GMIC as the operating voltage of the gamma voltage unit GMIC. With the power supplied by the power management unit PMIC, the gamma voltage unit GMIC can generate a gamma binding point voltage VGamma corresponding to each binding point's gray scale based on the stored gamma register data, and transmits the gamma binding point voltage VGamma to the source driver circuit SIC. In this way, the source driver circuit SIC can determine the gamma voltage of each pixel based on the screen synchronization data and the gamma binding point voltage VGamma. Therefore, the source driver circuit SIC realizes gamma compensation of the display screen. Referring to FIG. 11, in this example, the gamma voltage unit GMIC can also generate a common voltage VCOM and transmits it to the liquid crystal display panel PNL.

Figure 7:
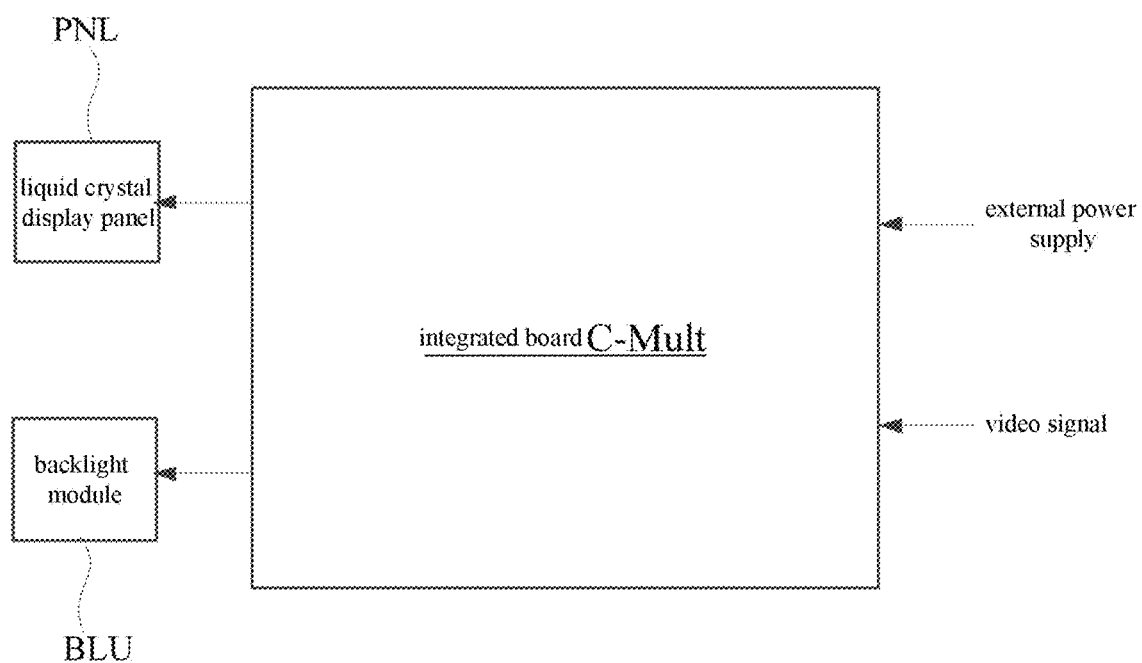
FIG. 7 is a schematic diagram of an integrated board directly receiving a video signal in an embodiment of the present disclosure.

In some embodiments of the present disclosure, the integrated board further includes a communication module located on the circuit board. The communication module is configured to perform at least one of the following functions: receiving a video signal, receiving a control signal, and sending a signal to an external device. In this way, referring to FIG. 7, the integrated board can directly receive the video signal and provide the screen data to the FPGA based on the video signal.

In one embodiment of the present disclosure, referring to FIG. 11, the communication module includes at least one video signal port and a signal conversion unit TRU. The video signal port is configured to receive a video signal and forward it to the signal conversion unit TRU. The signal conversion unit TRU is configured to transcode the video signal into the screen data and to forward the screen data to the FPGA. In this way, the communication module can receive the video signal and provide the screen data to the FPGA based on the video signal, which allows the integrated board to also fulfill the function of a system board C-SOC in the related art and can further reduce the number of boards in the control module CTR.

In one example, referring to FIG. 11, the signal conversion unit TRU can forward the screen data to the FPGA in the form of a TTL signal, for example, in the form of a 24-channel TTL signal. It will be understood that, in other examples of the present disclosure, the signal conversion unit TRU may also use other signals to forward the screen data, for example, by means of a SPI signal, a LVDS signal, or a Mini LVDS signal.

Optionally, the video signal port is selected from one or more of: a High Definition Multimedia Interface (HDMI) port, a Digital Visual Interface (DVI) port, a Video Graphics Array (VGA) port and a DisplayPort (DP) port. In one example, an HDMI port and a DVI port are provided on the integrated board.

In one embodiment of the present disclosure, referring to FIG. 11, the communication module of the integrated board may also include a serial communication port to enable the integrated board to communicate with an external device. Further, the serial communication port may include a serial input port RSIN and a serial output port RSOUT. The serial input port RSIN may receive external communication signals, for example, the serial input port RSIN is configured to receive an external control signal and transmit it to the FPGA. The serial output port RSOUT is configured to send a communication signal to an external device, for example, the serial output port RSOUT is configured to send a signal generated by the FPGA to an external device. In one example, the serial input port RSIN and the serial output port RSOUT are RS-232 standard interfaces (asynchronous transmission standard interface).

In one example, referring to FIG. 11, the serial input port RSIN can forward the communication signal to the FPGA and the FPGA can respond to the communication signal. For example, a debugging device may send a debugging signal to the FPGA as a communication signal via the serial input port RSIN, and the FPGA adjusts the display state of the display device in response to the debugging signal, such as adjusting the color of the screen, adjusting the resolution, and displaying the debugging interface. The serial output port RSOUT can receive the communication signal sent by the FPGA and forward it to an external device.

In some embodiments of the present disclosure, referring to FIG. 11, the communication module further includes an infrared sensor IRM. The infrared sensor IRM is configured to generate a control signal by receiving an infrared signal to and transmit the control signal to the FPGA.

Figure 12:
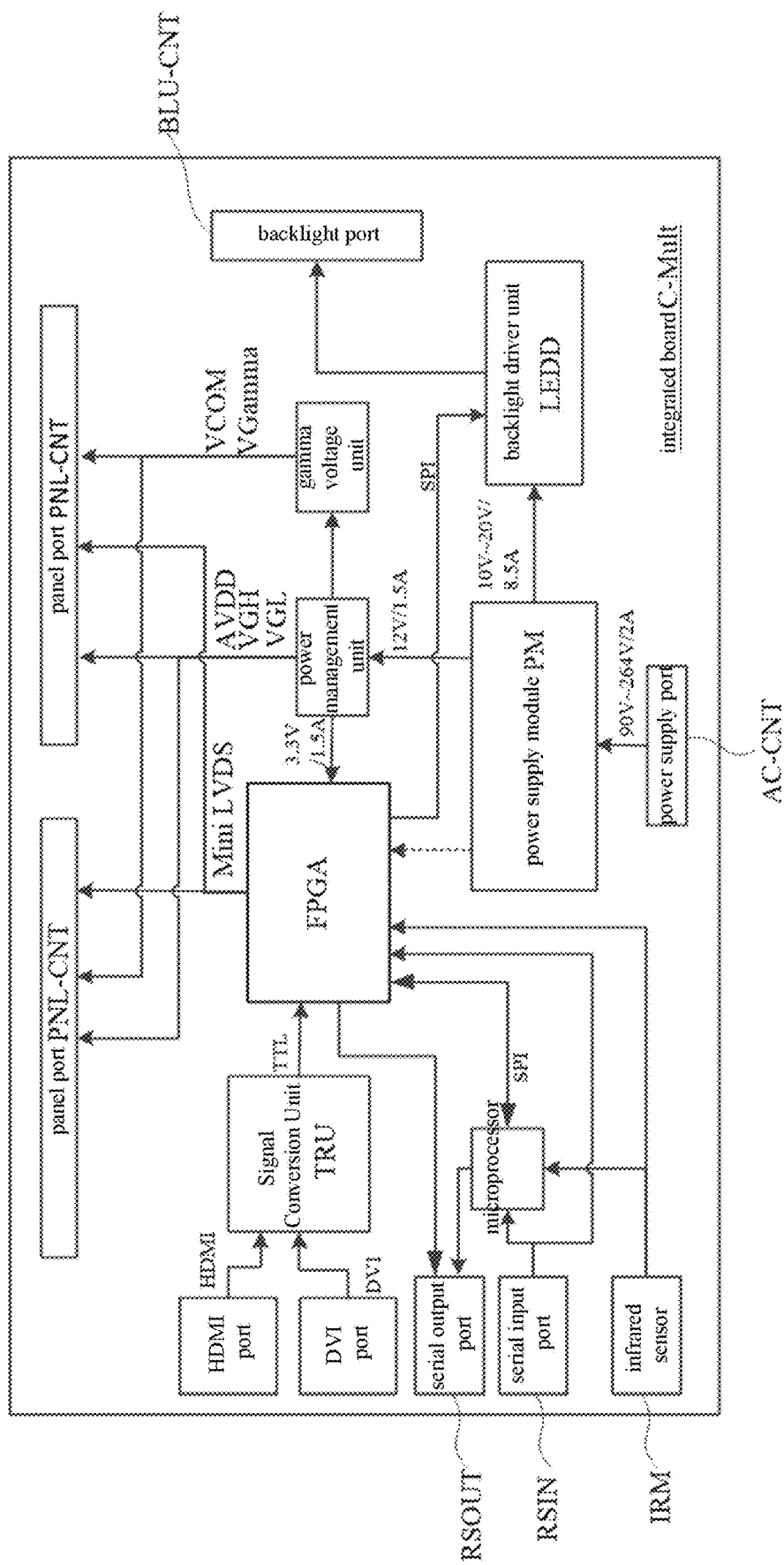
FIG. 12 is a schematic diagram of a structure of an integrated board with a communication module in an embodiment of the present disclosure.

In another embodiment of the present disclosure, referring to FIG. 12, the communication module of the integrated board may further include a microprocessor MCU. The microprocessor MCU is configured to interact with the FPGA. The serial input port RSIN is configured to transmit a control signal to the microprocessor MCU or to the FPGA. The serial output port RSOUT is configured to send out a signal generated by the FPGA or the microprocessor MCU. The infrared sensor IRM is configured to generate a control signal by receiving an infrared signal and transmit the control signal to the FPGA or the microprocessor MCU.

In this way, the microprocessor MCU can communicate with the serial input port RSIN, the serial output port RSOUT, and the FPGA. The communication signal received at the serial input port RSIN can be forwarded to the microprocessor MCU, which can respond to the communication signal directly or forward the communication signal to the FPGA after preprocessing so that the FPGA can respond to it further. The microprocessor MCU can directly forward the communication signal received at the serial input port RSIN to an external device through the serial output port RSOUT, or generate a relay signal based on the communication signal received at the serial input port RSIN and forward the relay signal to an external device through the serial output port RSOUT, or generate a communication signal in response to a command from the FPGA and forward the communication signal to an external device through the serial output port RSOUT.

In one embodiment, the display device includes a plurality of integrated boards connected in a cascade. After receiving a communication signal at a serial input port RSIN of an integrated board at a $N^{th}$ stage, the integrated board at the $N^{th}$ stage may, on the one hand, respond to the communication signal, and, on the other hand, may forward the communication signal to a serial input port RSIN of an integrated board at the $(N+1)^{th}$ stage through a serial output port RSOUT of the integrated board at the $N^{th}$ stage, or may, on the basis of the communication signal, generate a relay signal (as a communication signal of an integrated board at the $(N+1)^{th}$ stage) and forward it to a serial input port RSIN of the integrated board at the $(N+1)^{th}$ stage through a serial output port RSOUT of the integrated board at the $N^{th}$ stage.

In another embodiment, the FPGA or microprocessor MCU of the integrated board can send its own operating parameters or feedback signals in the form of communication signals to an external device via the serial output port RSOUT.

It will be understood that the integrated board of the present disclosure may or may not be provided with a microprocessor MCU. The integrated board may not be equipped with the microprocessor MCU by adjusting the FPGA, e.g., by using a more powerful FPGA. Of course, the multiprocessor MCU may also be provided on the integrated board to complement the FPGA in order to share the functions of the FPGA or to reserve hardware redundancy for upgrades of the integrated board.

Figure 8:
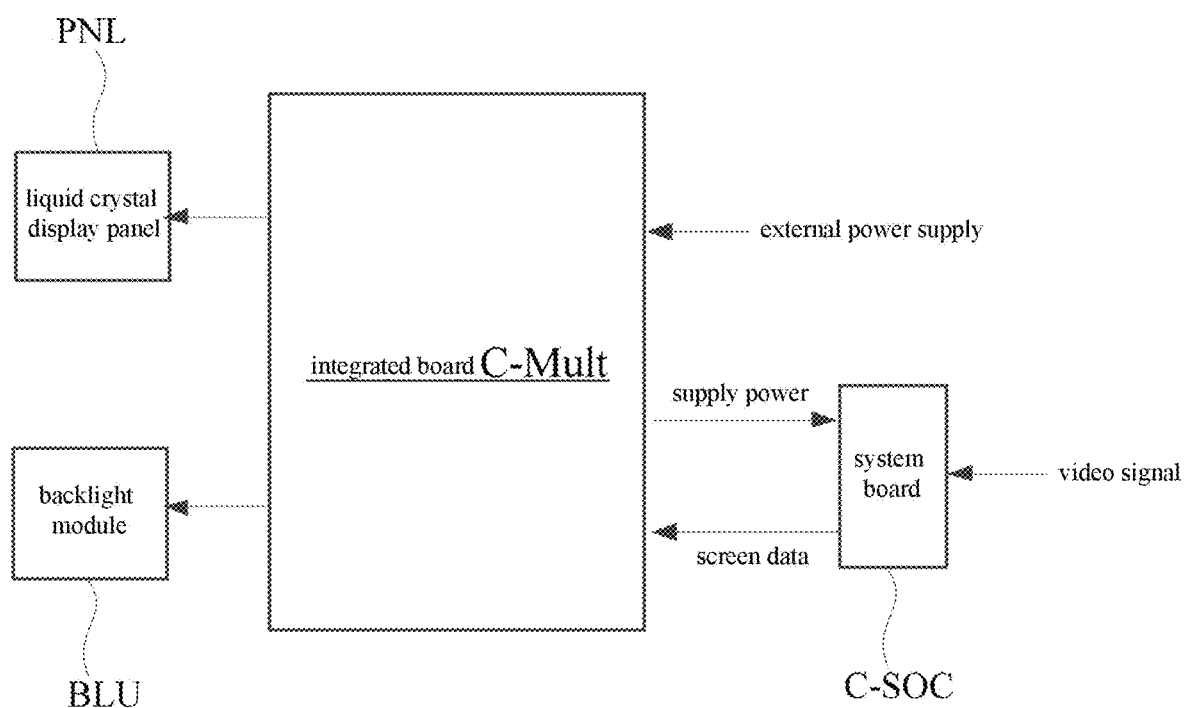
FIG. 8 is a schematic diagram of an integrated board working with a system board in an embodiment of the present disclosure.
Figure 13:
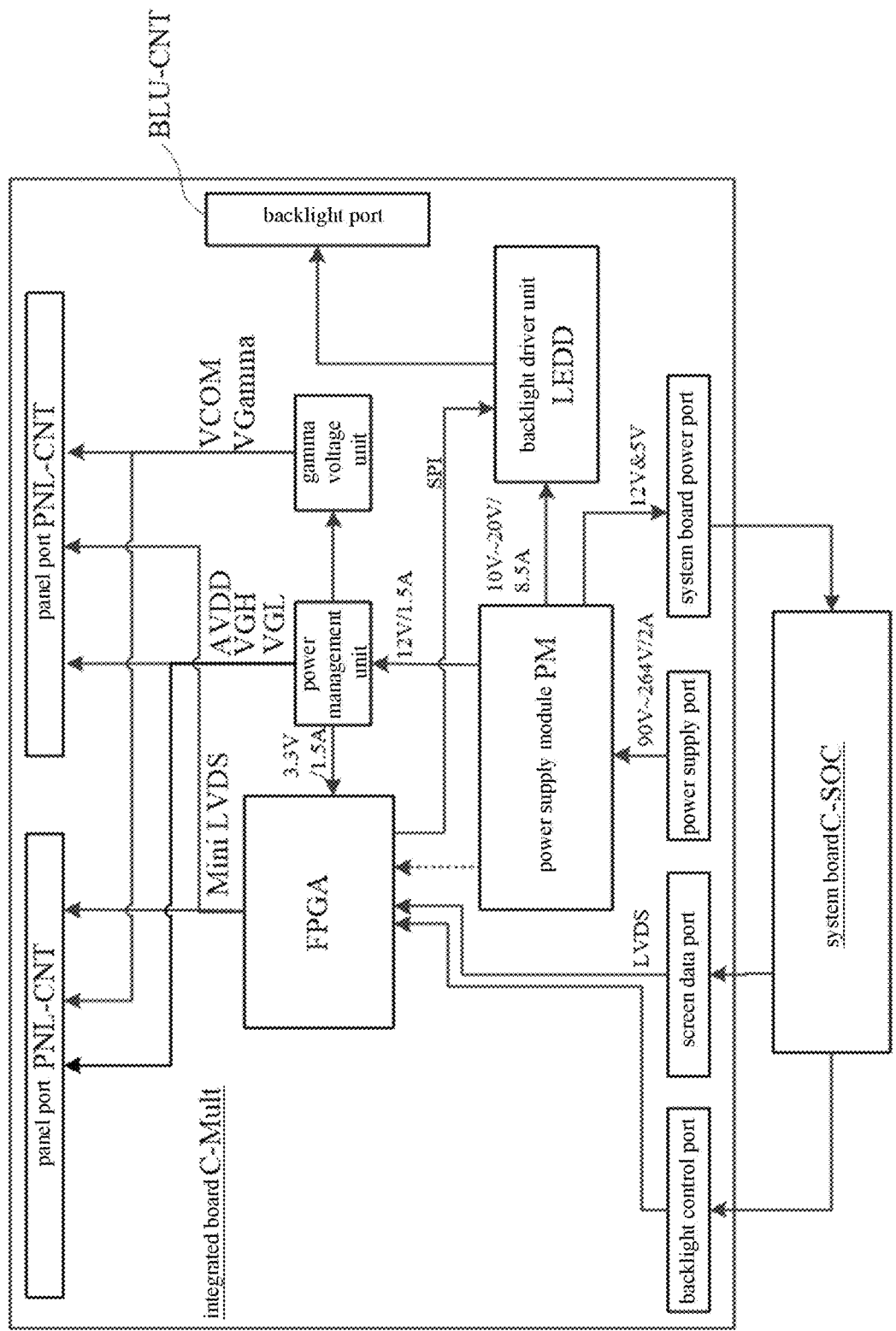
FIG. 13 is a schematic diagram of a structure of an integrated board with a system board interface module in an embodiment of the present disclosure.
Figure 14:
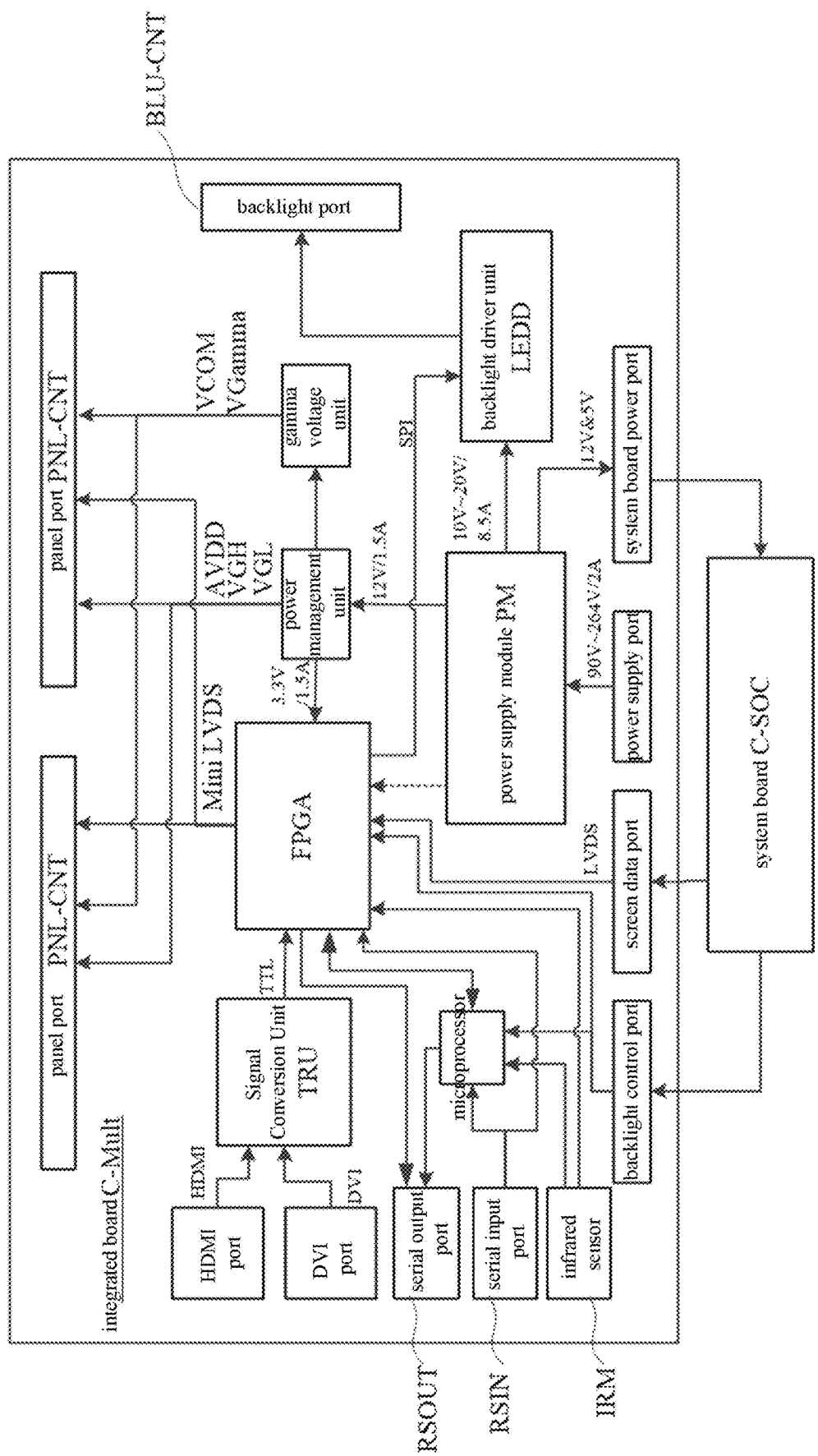
FIG. 14 is a schematic diagram of a structure of an integrated board with a communication module and a system board interface module in an embodiment of the present disclosure.

In some embodiments of the present disclosure, referring to FIGS. 13 and 14, the integrated board is provided with a system board interface module disposed on the circuit board. The system board interface module is configured to connect to a system board. In this way, referring to FIG. 8, the integrated board can be connected to a system board C-SOC. When the integrated board is connected to the system board C-SOC, the integrated board can perform the functions of the power supply board C-Power, the screen driver board C-TCON and the conversion board C-CONV in the related art, and can realize the response synchronization of the liquid crystal display panel PNL and the backlight module BLU.

In one embodiment of the present disclosure, referring to FIG. 13, the system board interface module may include a screen data port. The screen data port is configured to receive the screen data from the system board and send the screen data to the FPGA. The screen data is generated by the system board based on a video signal. In this embodiment, the system board C-SOC may receive a video signal, decode the video signal into the screen data, and transmit the screen data to the FPGA via the screen data port. In one example, the screen data may be transmitted via a LVDS signal.

In one embodiment of the present disclosure, referring to FIG. 13, the integrated board includes a power supply module PM located on the circuit board. The system board interface module includes a system board power port, the system board power port being electrically connected to the power supply module PM and configured to be capable of supplying power to the system board. In this way, the system board power port is connected to the power port of the system board C-SOC to enable the power supply module PM to supply power to the system board C-SOC through the system board power port. In one example, the power supply module PM may provide multiple different voltages to the system board C-SOC through the system board power port, such as providing two different voltages, 5V and 12V, to meet the different voltage requirements of the system board C-SOC.

In one embodiment of the present disclosure, referring to FIG. 13, the system board interface module includes a backlight control port. The backlight control port is configured to receive a backlight control signal from the system board and transmit it to the FPGA. Of course, if a microprocessor MCU is provided on the integrated board, the backlight control signal can also be sent to the microprocessor MCU.

Referring to FIG. 14, the system board C-SOC can input the backlight control signal to the microprocessor MCU or FPGA through the backlight control port. The backlight control signal may include at least one of a backlight power-on signal (BLON) and a backlight brightness signal. When the display device is powered on, the system board C-SOC can input the backlight power-on signal to the microprocessor MCU or FPGA through the backlight control port, which causes the backlight module BLU to be lighted. The system board C-SOC can respond to external control, for example, responding to the user's screen brightness debugging action, and input the backlight brightness signal to the FPGA or microprocessor MCU through the backlight control port. The FPGA or microprocessor MCU adjusts the maximum display brightness of the display device in response to the backlight brightness signal.

In some examples of the present disclosure, referring to FIGS. 11 and 12, the integrated board may be provided with a communication module instead of a system board interface module. In this way, the integrated board itself can perform the functions of the system board C-SOC, the screen driver board C-TCON, the power supply board C-Power, and the conversion board C-CONV in the related art, which significantly improves the integration degree of the control module CTR and improves the assembly efficiency of the display device, and reduces the cost of the display device.

In other examples of the present disclosure, referring to FIG. 13, the integrated board may be provided with a system board interface module instead of a communication module. In this way, the integrated board can perform the functions of the screen driver board C-TCON, the power supply board C-Power, and the conversion board C-CONV in the related art. The control module CTR of the display device includes the integrated board and the system board C-SOC that is compatible with the integrated board. In this example, the system board C-SOC can be flexibly selected according to different needs, increasing the flexibility of the control module CTR in terms of matching and functions, and thus increasing the scope of application of the integrated board.

Of course, in other embodiments of the present disclosure, referring to FIG. 14, the integrated board can be provided with both a communication module and a system board interface module. In this way, the integrated board can be used alone or in conjunction with the system board C-SOC, thereby achieving a wider scope of application.

Those skilled in the art, after considering the specification and practicing the invention disclosed herein, will readily conceive of to other embodiments of the present disclosure. This application is intended to cover any variations, uses, or adaptations of the present disclosure that follow the general principles of the present disclosure and that include means of common knowledge or customary skill in the art not disclosed herein. The specification and embodiments are to be considered exemplary only, and the true scope and spirit of the disclosure is indicated by the appended claims.

What is claimed is:

1. An integrated board for a liquid crystal display device, the integrated board comprising a field programmable gate array and a backlight driver on a same circuit board, wherein
the field programmable gate array is configured to:
receive screen data,
generate screen synchronization data based on the screen data, and send the screen synchronization data to a liquid crystal display panel, and
generate backlight drive data based on the screen data and send the backlight drive data to the backlight driver; and
the backlight driver is configured to receive the backlight drive data, wherein a delay between receiving the backlight drive data and receiving the screen synchronization data is less than one frame of time; and
the integrated board further comprises a storage module, wherein
the storage module is a storage circuit on the circuit board, or the storage module is a storage unit of the field programmable gate array, or the storage module comprises a storage unit of the field programmable gate array and a storage circuit on the circuit board;
the storage module is configured to store configuration information for the backlight driver, a debugging interface configuration, and at least part of programs for the field programmable gate array;
the field programmable gate array is configured to generate, based on the screen data, the screen synchronization data and backlight synchronization data, and to cache the screen synchronization data and the backlight synchronization data to the storage module;
the field programmable gate array is further configured to forward the screen synchronization data in the storage module to the liquid crystal display panel, to generate the backlight drive data based on the backlight synchronization data and the configuration information of the backlight driver in the storage module, and to send the backlight drive data to the backlight driver; and
the field programmable gate array is further configured to invoke the debugging interface configuration in response to a debugging signal and cause the liquid crystal display device to display a debugging interface.

2. The integrated board of claim 1, wherein the storage circuit comprises a first storage sub-circuit on the circuit board, the first storage sub-circuit storing the configuration information of the backlight driver;
the field programmable gate array is configured to generate, based on the screen data, the screen synchronization data and the backlight synchronization data, and to cache the screen synchronization data and the backlight synchronization data to the first storage sub-circuit; and
the field programmable gate array is further configured to forward the screen synchronization data in the first storage sub-circuit to the liquid crystal display panel, to generate the backlight drive data based on the backlight synchronization data and the configuration information of the backlight driver in the first storage sub-circuit, and to send the backlight drive data to the backlight driver.

3. The integrated board of claim 1, wherein the storage circuit comprises a second storage sub-circuit on the circuit board, the second storage sub-circuit storing the debugging interface configuration; and
the field programmable gate array is further configured to invoke the debugging interface configuration in response to the debugging signal and cause the liquid crystal display device to display the debugging interface.

4. The integrated board of claim 1, wherein the storage circuit comprises a third storage sub-circuit on the circuit board, the third storage sub-circuit storing the at least part of the programs for the field programmable gate array.

5. The integrated board of claim 1, wherein the field programmable gate array comprises a first field programmable gate array and a second field programmable gate array;
the first field programmable gate array is configured to receive the screen data and forward the screen data to the second field programmable gate array; and
the second field programmable gate array is configured to generate, based on the screen data, the screen synchronization data and the backlight drive data; and the second field programmable gate array is further configured to send the screen synchronization data to the liquid crystal display panel and to send the backlight drive data to the backlight driver-unit within the same frame of time.

6. The integrated board of claim 5, comprising a first storage sub-circuit and a third storage sub-circuit located on the circuit board,
the first storage sub-circuit storing configuration information for the backlight driver,
the third storage sub-circuit storing at least part of programs for the second field programmable gate array; wherein
the second field programmable gate array is configured to generate, based on the screen data, the screen synchronization data and backlight synchronization data, and to cache the screen synchronization data and the backlight synchronization data to the first storage sub-circuit; and
the second field programmable gate array is further configured to, within the same frame of time, forward the screen synchronization data in the first storage sub-circuit to the liquid crystal display panel, to generate the backlight drive data based on the backlight synchronization data and the configuration information of the backlight driver in the first storage sub-circuit, and to send the backlight drive data to the backlight driver.

7. The integrated board of claim 5, comprising a second storage sub-circuit on the circuit board, the second storage sub-circuit storing debugging interface configuration; wherein
the first field programmable gate array is further configured to receive a debugging signal, to invoke the debugging interface configuration in response to the debugging signal, to generate a debugging screen, and to transmit the degugging screen as the screen data to the second field programmable gate array.

8. The integrated board of claim 1, wherein the circuit board is further provided with a power supply module, a power management Integrated Circuit (IC), and a gamma voltage IC;
the power supply module is configured to connect to an external power supply and to supply power to the power management IC and the backlight driver;
the power management IC is configured to supply a plurality of different supply voltages to the liquid crystal display panel, and to supply power to the gamma voltage IC; and
the gamma voltage IC is configured to provide the liquid crystal display panel with a common voltage and a gamma binding point voltage corresponding to each binding point's gray scale; and wherein the field programmable gate array is powered by the power supply module or the power management IC.

9. The integrated board of claim 8, further comprising a power supply selection unitcircuit configured to select one of the power supply module and the power management unitIC to supply power to the field programmable gate array.

10. The integrated board of claim 1, further comprising a communication module on the circuit board, wherein the communication module is configured to perform at least one of following functions: receiving a video signal, receiving a control signal, and sending a signal to an external device.

11. The integrated board of claim 10, wherein the communication module comprises a video signal port and a signal converter;

the video signal port is configured to receive the video signal and forward the video signal to the signal converter; and the signal converter is configured to transcode the video signal into the screen data, and to forward the screen data to the field programmable gate array.

12. The integrated board of claim 10, wherein the communication module comprises a serial input port and a serial output port, wherein the serial input port is configured to transmit the control signal to the field programmable gate array, and the serial output port is configured to send a signal generated by the field programmable gate array to the external device;

or, the communication module comprises an infrared sensor configured to generate the control signal by receiving an infrared signal, and to transmit the control signal to the field programmable gate array;

or, the communication module comprises a microprocessor and at least one of: a serial input port, a serial output port, and an infrared sensor, wherein the microprocessor is configured to interact with the field programmable gate array; the serial input port is configured to transmit the control signal to the microprocessor or the field programmable gate array; the serial output port is configured to send a signal generated by the field programmable gate array or by the microprocessor to the external device; and the infrared sensor is configured to generate the control signal by receiving an infrared signal, and to transmit the control signal to the field programmable gate array or the microprocessor.

13. The integrated board of claim 1, wherein the integrated board is provided with a system board interface module on the circuit board, the system board interface module being configured to connect to a system board.

14. The integrated board of claim 13, comprising a power supply module and a microprocessor on the circuit board, the microprocessor being configured to interact with the field programmable gate array; wherein the system board interface module comprises:

a screen data port configured to receive the screen data from the system board and send the screen data to the field programmable gate array, the screen data being generated by the system board based on a video signal;

a system board power port, the system board power port being electrically connected to the power supply module and configured to be capable of supplying power to the system board; and a backlight control port configured to receive a backlight control signal from the system board and to transmit the backlight control signal to the field programmable gate array or the microprocessor.

15. The integrated board of claim 1, wherein the backlight driver-unit is configured to drive a backlight module directly based on the backlight drive data.

16. A control module for a liquid crystal display device, comprising the integrated board of claim 1.

17. A liquid crystal display device comprising the control module of claim 16, wherein the liquid crystal display device further comprises a liquid crystal display panel and a backlight module, the integrated board being electrically connected with the liquid crystal display panel and the backlight module.

18. The liquid crystal display device of claim 17, wherein the backlight module comprises a plurality of light areas distributed in an array that are configured to be driven by local dimming.

19. The liquid crystal display device of claim 17, wherein the liquid crystal display panel is a spliced display panel and comprises a plurality of sub-display panels.

* * * * *